(12) United States Patent
Imai et al.

(10) Patent No.: US 8,220,012 B2
(45) Date of Patent: Jul. 10, 2012

(54) HOLDING MEMBER, DRIVING APPARATUS, PICKUP APPARATUS, AND DISC APPARATUS

(75) Inventors: Kenichi Imai, Ota (JP); Shunichi Morimoto, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 96 days.

(21) Appl. No.: 12/761,276

(22) Filed: Apr. 15, 2010

(65) Prior Publication Data

US 2010/0220580 A1    Sep. 2, 2010

Related U.S. Application Data

(63) Continuation of application No. PCT/JP2008/068785, filed on Oct. 16, 2008.

(30) Foreign Application Priority Data

Oct. 16, 2007    (JP) .................................. 2007-268469

(51) Int. Cl.
*G11B 7/09* (2006.01)

(52) U.S. Cl. ....................... 720/683; 359/814; 369/44.22

(58) Field of Classification Search .... 369/44.14–44.16, 369/44.22; 359/814; 720/681–687
See application file for complete search history.

(56) References Cited

U.S. PATENT DOCUMENTS

| 5,617,256 | A  | * | 4/1997  | Mitsumori et al. | ........... 359/814  |
| 6,507,554 | B2 | * | 1/2003  | Son et al.       | ........... 720/683  |
| 7,028,318 | B2 | * | 4/2006  | Tajiri           | ........... 720/684  |
| 7,746,733 | B2 | * | 6/2010  | Iijima et al.    | ........... 369/44.14|
| 2005/0286356 | A1 | * | 12/2005 | Han         | ........... 369/44.14|

FOREIGN PATENT DOCUMENTS

| JP | HB-129767   | 5/1996  |
| JP | 2004-118969 | 4/2004  |
| JP | 2006-344276 | 12/2006 |

OTHER PUBLICATIONS

ISA/US, Int'l Search Report/Written Opinion in PCT/JP2008/068785 in the name of Sanyo Electric Co., Ltd., dated Nov. 18, 2008. WO2009/051198.

* cited by examiner

*Primary Examiner* — Will J Klimowicz
(74) *Attorney, Agent, or Firm* — SoCal IP Law Group LLP; Steven C. Sereboff; John E. Gunther

(57) ABSTRACT

A holding member provided with a coil comprising a proximity facilitating portion capable of bringing the coil closer to a magnetic member facing the coil.

7 Claims, 10 Drawing Sheets

HOLDING MEMBER, DRIVING APPARATUS, PICKUP APPARATUS, AND DISC APPARATUS

CROSS-REFERENCE TO RELATED APPLICATIONS

This application is a continuation application of International Patent Application No. PCT/JP2008/068785 filed Oct. 16, 2008, which claims the benefit of priority to Japanese Patent Application No. 2007-268469 filed Oct. 16, 2007. The full contents of the International Patent Application are incorporated herein by reference.

BACKGROUND OF THE INVENTION

1. Field of the Invention

The present invention relates to a holding member, a driving apparatus, a pickup apparatus, and a disc apparatus.

2. Description of the Related Art

FIG. 7 is a perspective view illustrating an embodiment of a holding member, driving apparatus, and pickup apparatus, FIG. 8 is a perspective view illustrating the holding member, FIG. 9 is an explanatory diagram of a portion of the driving apparatus, and FIG. 10 is also an explanatory diagram of a portion of the driving apparatus.

A coil 540 (FIGS. 7, 9, 10) is made up such that a substantially linear conductor is directly wound around a coil mounting portion 520 of a lens holding member 510 (FIG. 8), so-called lens holder 510. The substantially flat-plate-shaped coil 540 in a substantially rectangular annular shape is made up such that the substantially linear conductor is directly wound around the coil mounting portion 520 of the lens holder 510 (FIG. 7). The coil mounting portion 520 of the lens holder 510 of a type depicted in FIGS. 7 and 8 includes wire-wound flange portions 523, 524 that prevent the coil 540 formed by winding the conductor from being accidentally detached from a coil supporting unit 529 of the coil mounting portion 520.

For example, in the case where a driving apparatus 505 (FIG. 9) of an optical pickup apparatus 503 (FIG. 7) is in an initial state, or an objective lens is in a focused position for a signal layer of an optical disc (all not depicted), the coil 540 making up the driving apparatus 505, so-called actuator 505, is in such a neutral state as to be in a substantially vertically middle position relative to magnets 80, 90 facing the coil 540 when a portion of the actuator 505 is viewed laterally from inside to outside, for example.

A actuator of an optical pickup apparatus includes an actuator of an optical head made up such that an air-core focus coil is formed by winding around a rectangular objective lens holder, flat tracking coils are bonded to two surfaces thereof that are the opposing sides of the objective lens holder and in positions opposing to each other, and a black ground glass plate materials are bonded to the focusing coil adjacently thereto, for example, (see Japanese Patent Application Laid-Open Publication No. 08-129767 pp. 1 and 3 to 4, FIGS. 1 to 3, for example).

The actuator of the optical head depicted in the above Patent Document is described as a type of an actuator of the optical pickup apparatus in which the wire-wound flange portion for fixing the flat tracking coil is not required for the objective lens holder.

However, it has been considered to be difficult to further improve the sensitivity of the coil 540 to the magnets 80, 90, with the holding member 510 (FIGS. 7 and 8), the driving apparatus 505 (FIGS. 7 to 10), and the pickup apparatus 503 (FIGS. 7 and 8).

In the lens holder 510 of such a type that the coil 540 is made up by directly winding the substantially linear conductor around the coil mounting portion 520 of the lens holder 510, the wire-wound flange portions 523, 524, which prevents the coil 540 formed by winding from being accidentally detached from the coil supporting portion 529, are formed extending from the coil supporting unit 529 (FIG. 8) of the coil mounting portion 520, and thus, the magnets 80, 90 (FIGS. 9 and 10) facing the coil 540 are kept away from the coil 540 (FIG. 7) by the thickness of the wire-wound flange portions 523, 524 (FIGS. 7 and 8).

When the magnets 80, 90 (FIGS. 9 and 10) are kept away from the coil 540 (FIGS. 7, 9, and 10), it becomes difficult to effectively use the magnetic field generated from the magnets 80, 90, so that the magnetic field is wastefully used. Therefore, a loss of sensitivity is caused in the magnets 80, 90 and the coil 540. Since an unnecessary clearance, so-called gap is created between the magnets 80, 90 (FIGS. 9 and 10) and the coil 540 by the thickness of the wire-wound flange portions 523, 524 (FIGS. 7 and 8), the magnetic field generated from the magnets 80, 90 is not effectively utilized and a loss of sensitivity is caused in the magnets 80, 90 and the coil 540.

As a measure, such a configuration has been conceived that has an air-core tracking coil adhered to a focus coil formed by winding around an objective lens holder as described in the above Patent Document, for example. However, if an air-core tracking coil is adhered to a focus coil formed by winding around a lens holder, since no positioning portion exists for positioning and mounting on the focus coil the air-core tracking coil provided separately from the lens holder and the focus coil, the mounting operation of the air-core tracking coil is very difficult, which is considered to be a problem.

In association with the fact that the mounting operation of the air-core tracking coil is very difficult, it is also considered to be a problem that the cost becomes very high for the assembly operation of the air-core tracking coil to the focus coil.

As illustrated in FIG. 7, the substantially rectangular annular coil 540 is made up by directly winding the substantially linear conductor around the coil mounting portion 520 of the lens holder 510 and is formed in a substantially flat plate shape.

In the case where a whole of a first flat surface portion 541 of the substantially flat-plate-shaped coil 540 in a substantially rectangular annular shape is located over a whole of a flat surface portion 81 of the first substantially flat-plate-shaped magnet 80 (FIG. 9) with a predetermined distance in a substantially uniform manner, where the first flat surface portion 541 of the substantially flat-plate-shaped coil 540 in a substantially rectangular annular shape is disposed substantially parallel to the flat surface portion 81 of the first substantially flat-plate-shaped magnet 80, where a whole of a second flat surface portion 542 of the substantially flat-plate-shaped coil 540 in a substantially rectangular annular shape is located over a whole of a flat surface portion 92 of the second substantially flat-plate-shaped magnet 90 with a predetermined distance in a substantially uniform manner, and where the second flat surface portion 542 of the substantially flat-plate-shaped coil 540 in a substantially rectangular annular shape is disposed substantially parallel to the flat surface portion 92 of the second substantially flat-plate-shaped magnet 90; when a movable unit 507 including the coil 540 of the actuator 505 is moved substantially along an up-and-down direction D1, for example (FIG. 10), a substantially curved first end 543a on the upper side of the substantially rectangular annular coil 540 may be located above an upper end surface portion 83 of the substantially flat-plate-shaped first magnet 80, and a substantially curved second end 543b on the upper side of the substantially rectangular annular coil 540 may be located above an upper end surface portion 93 of the substantially flat-plate-shaped second magnet 90.

Alternatively, a substantially curved third end 544a on the lower side of the substantially rectangular annular coil 540 may be located below a lower end surface portion 84 of the substantially flat-plate-shaped first magnet 80 (not depicted), and a substantially curved fourth end 544b on the lower side of the substantially rectangular annular coil 540 may be located below a lower end surface portion 94 of the substantially flat-plate-shaped second magnet 90 (not depicted).

As depicted in FIG. 10, for example, when a portion of the actuator 505 is viewed laterally from inside to outside, if the substantially curved first end 543a on the upper side of the substantially rectangular annular coil 540 protrudes upward from the upper end surface portion 83 of the substantially flat-plate-shaped first magnet 80, and if the substantially curved second end 543b on the upper side of the substantially rectangular annular coil 540 protrudes upward from the upper end surface portion 93 of the substantially flat-plate-shaped second magnet 90, change in sensitivity is increased in the substantially curved ends 543a, 543b on the upper side of the substantially rectangular annular coil 540.

For example, when a portion of the actuator 505 is viewed laterally from inside to outside, if the substantially curved first end 543a on the upper side of the substantially rectangular annular coil 540 protrudes upward from the upper end surface portion 83 of the substantially flat-plate-shaped first magnet 80 and if the substantially curved second end 543b on the upper side of the substantially rectangular annular coil 540 protrudes upward from the upper end surface portion 93 of the substantially flat-plate-shaped second magnet 90, thrust is changed in the substantially curved ends 543a, 543b on the upper side of the substantially rectangular annular coil 540.

Alternatively, for example, when a portion of the actuator 505 is viewed laterally from inside to outside, if the substantially curved third end 544a on the lower side of the substantially rectangular annular coil 540 protrudes downward from the lower end surface portion 84 of the substantially flat-plate-shaped first magnet 80 (not depicted), and if the substantially curved fourth end 544b on the lower side of the substantially rectangular annular coil 540 protrudes downward from the lower end surface portion 94 of the substantially flat-plate-shaped second magnet 90 (not depicted), change in sensitivity is increased in the substantially curved ends 544a, 544b on the lower side of the substantially rectangular annular coil 540.

For example, when a portion of the actuator 505 is viewed laterally from inside to outside, if the substantially curved third end 544a on the lower side of the substantially rectangular annular coil 540 protrudes downward from the lower end surface portion 84 of the substantially flat-plate-shaped first magnet 80 (not depicted), and if the substantially curved fourth end 544b on the lower side of the substantially rectangular annular coil 540 protrudes downward from the lower end surface portion 94 of the substantially flat-plate-shaped second magnet 90 (not depicted), thrust is changed in the substantially curved ends 544a, 544b on the lower side of the substantially rectangular annular coil 540.

Those described above have significant influences on the thrust of the coil 540 for the magnets 80, 90, and the like, which is considered to be a problem.

For example, when a portion of the actuator 505 is viewed laterally from inside to outside, if the substantially curved first end 543a on the upper side of the substantially rectangular annular coil 540 protrudes upward from the upper end surface portion 83 of the substantially flat-plate-shaped first magnet 80, and if the substantially curved second end 543b on the upper side of the substantially rectangular annular coil 540 protrudes upward from the upper end surface portion 93 of the substantially flat-plate-shaped second magnet 90, a "deviation" occurs at a force application point that is the center of the force generated in the whole of the coil 540, for example, resulting in an effect on the vibration mode, etc., of the actuator 505, for example, which is considered to be a problem.

Alternatively, for example, when a portion of the actuator 505 is viewed laterally from inside to outside, if the substantially curved third end 544a on the lower side of the substantially rectangular annular coil 540 protrudes downward from the lower end surface portion 84 of the substantially flat-plate-shaped first magnet 80 (not depicted), and if the substantially curved fourth end 544b on the lower side of the substantially rectangular annular coil 540 protrudes downward from the lower end surface portion 94 of the substantially flat-plate-shaped second magnet 90 (not depicted), it is problematic that a "deviation" occurs at the force application point that is the center of the force generated in the whole of the coil 540, for example, and the vibration mode, etc., of the actuator 505, are affected for example, which is considered to be a problem.

Further reductions in the prices of the holding member 510, the driving apparatus 505, the pickup apparatus 503, and the disc apparatus are requested from the assembling makers that mount the pickup apparatuses 503 (FIG. 7) on optical disc apparatuses (not depicted), etc., for example, and the assembling makers that mount the optical disc apparatuses on personal computers (PC), etc.

SUMMARY OF THE INVENTION

A holding member provided with a coil according to an aspect of the present invention comprises a proximity facilitating portion capable of bringing the coil closer to a magnetic member facing the coil.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

Figure 1:
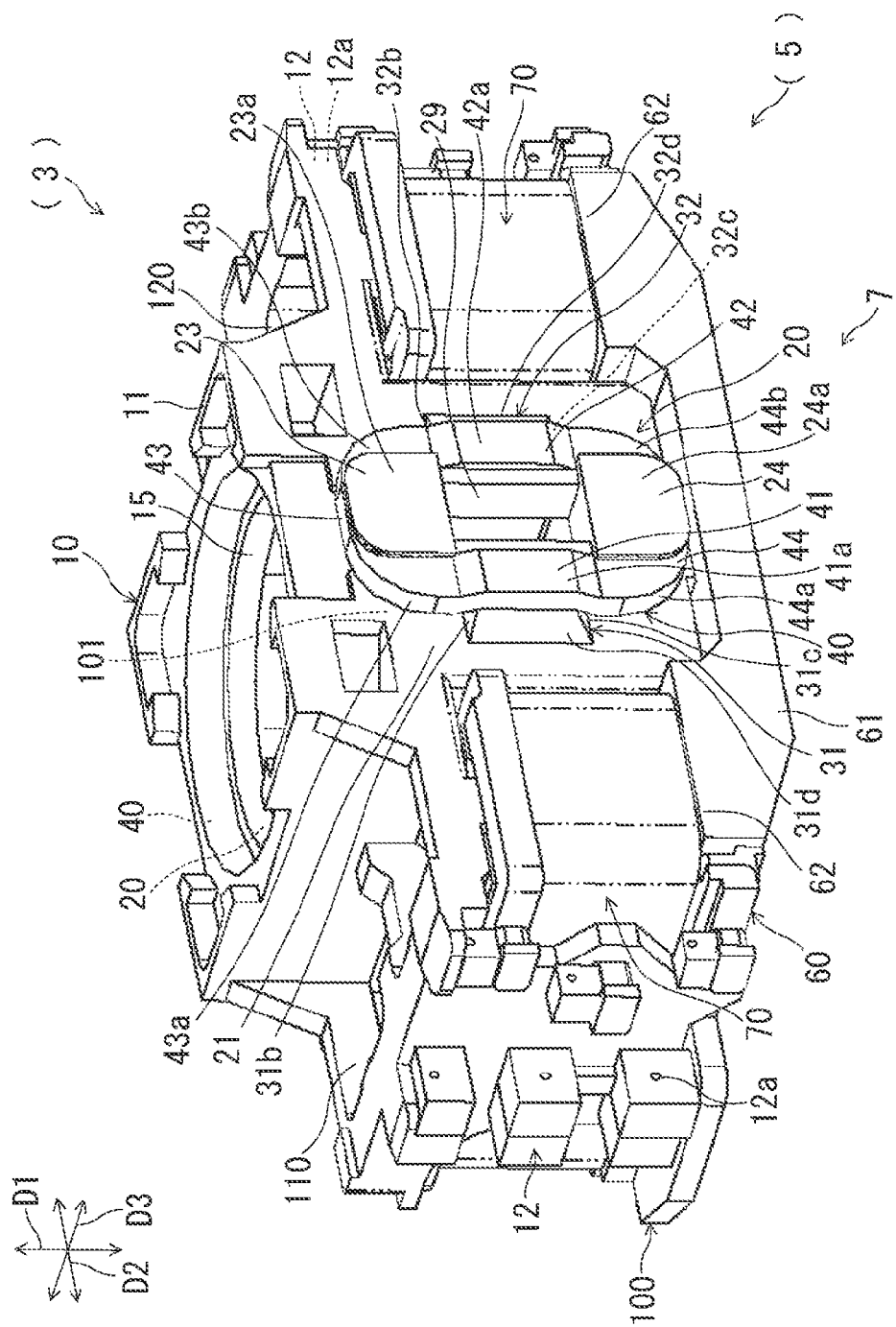
FIG. 1 is a perspective view of a holding member, a driving apparatus, and a pickup apparatus according to an embodiment of the present invention.

At least the following details will become apparent from descriptions of this specification and of the accompanying drawings.

A holding member according to an embodiment of the present invention is provided with a coil and includes at least a proximity facilitating portion capable of bringing the coil closer to a magnetic member facing the coil. Therefore, the magnetic field generated from the magnetic member is efficiently utilized and the sensitivity of the coil to the magnetic member is improved. When the proximity facilitating portion of the holding member is provided with the coil, since the proximity facilitating portion brings the coil closer to the magnetic member, the sensitivity of the coil to the magnetic member is improved.

In the holding member according to an embodiment of the present invention, the proximity facilitating portion is a protruding portion protruding from a reference surface portion of a coil mounting portion of a holding member main body provided with the coil toward the outside of the holding member main body. Therefore, the magnetic field generated from the magnetic member may be efficiently utilized and the sensitivity of the coil to the magnetic member may be improved. The protruding portion is protruding from the reference surface portion of the coil mounting portion of the holding member main body provided with the coil toward the outside of the holding member main body, and thus, when the coil mounting portion of the holding member main body is provided with the coil, the coil that is in contact with the protruding portion is pushed out toward the magnetic member. As a result, the coil is brought closer to the magnetic member. Therefore, the sensitivity of the coil disposed on the holding member to the magnetic member is improved.

In the holding member according to an embodiment of the present invention, the proximity facilitating portion is a protruding portion provided in such a manner as to protrude from a holding member main body provided with the coil toward the outside of the holding member main body. Therefore, the magnetic field generated from the magnetic member may be efficiently utilized and the sensitivity of the coil to the magnetic member may be improved. The protruding portion is provided in such a manner as to protrude from the holding member main body provided with the coil toward the outside of the holding member main body, and thus, when the holding member main body is provided with the coil, the coil that is in contact with the protruding portion is pushed out toward the magnetic member. As a result, the coil is brought closer to the magnetic member. Therefore, the sensitivity of the coil disposed on the holding member to the magnetic member is improved.

In the holding member according to an embodiment of the present invention, the coil is configured as a substantially flat-plate-shaped coil in a substantially rectangular annular shape and the proximity facilitating portion is provided on the holding member main body provided with the coil substantially corresponding to an effective length portion of the coil. Therefore, change in the sensitivity of the coil to the magnetic member may be reduced and displacement in the force application point of the coil may be reduced. The proximity facilitating portion is provided on the holding member main body, which is provided with the substantially flat-plate-shaped coil in a substantially rectangular annular shape substantially, corresponding to the effective length portion of the substantially flat-plate-shaped coil in a substantially rectangular annular shape, and thus, when the holding member main body is provided with the substantially flat-plate-shaped coil in a substantially rectangular annular shape, an space is reduced between the magnetic member and the effective length portion of the substantially flat-plate-shaped coil in a substantially rectangular annular shape that is in contact with the proximity facilitating portion. The effective length portion of the substantially flat-plate-shaped coil in a substantially rectangular annular shape results in being brought closest to the magnetic member. Correspondingly, the change in the sensitivity of the coil to the magnetic member is reduced and the change in the force application point of the coil is reduced. When electricity is passed through the substantially flat-plate-shaped coil in a substantially rectangular annular shape to drive the holding member provided with the substantially flat-plate-shaped coil in a substantially rectangular annular shape facing the magnetic member, the greatest driving force is generated in the effective length portion of the substantially flat-plate-shaped coil in a substantially rectangular annular shape.

The holding member according to an embodiment of the present invention includes a detachment preventing portion that prevents the coil from being detached from the coil mounting portion provided with the coil and an outermost surface portion of the detachment preventing portion and an outermost surface portion of the coil on an outermost surface portion of the proximity facilitating portion are located on substantially the same plane. Therefore, the magnetic field generated from the magnetic member may be efficiently utilized and the sensitivity of the coil to the magnetic member may be improved. The outermost surface portion indicates a surface portion of an object/objective part, which is most distanced from the substantially center part of the holding member toward the outside of the holding member, with respect to the object/objective part, using the substantially center part of the holding member as a reference, for example. Since the outermost surface portion of the detachment preventing portion and the outermost surface portion of the coil on the outermost surface portion of the proximity facilitating portion are located on substantially the same plane, it is avoided that an unnecessary gap is created between the magnetic member and the coil by the thickness of the detachment preventing portion. Since the space is reduced between the coil and the magnetic member, the magnetic field generated from the magnetic member is effectively utilized and occurrence of sensitivity loss is avoided in the magnetic member and the coil. The holding member includes the detachment preventing portion that prevents the coil formed by winding around the coil mounting portion from being unwound from the coil mounting portion, and thus, even if the coil is provided on the proximity facilitating portion of the holding member and the coil is brought closer to the magnetic members by the proximity facilitating portion, it is avoided that the coil is detached from the coil mounting portion provided with the coil.

In the holding member according to an embodiment of the present invention, the detachment preventing portion is a substantially plate-shaped flange portion that prevents the coil formed by winding around the coil mounting portion from being unwound from the coil mounting portion, and the proximity facilitating portion is a substantially pedestal-shaped protruding portion provided in such a manner as to protrude from the reference surface portion of the coil mounting portion of the holding member main body provided with the coil toward the outside of the holding member main body. Therefore, the magnetic field generated from the magnetic member may be efficiently utilized and the sensitivity of the coil to the magnetic member may be improved. The substantially pedestal-shaped protruding portion is protruding from the reference surface portion of the coil mounting portion of the holding member main body provided with the coil toward the outside of the holding member main body, and thus, when the coil mounting portion of the holding member main body is provided with the coil, the coil that is in contact with the substantially pedestal-shaped protruding portion is pushed out toward the magnetic member. As a result, the coil is brought closer to the magnetic member. Therefore, the sensitivity of the coil provided on the holding member to the magnetic member is improved. The holding member includes the substantially plate-shaped flange portion that prevents the coil formed by winding around the coil mounting portion from being unwound from the coil mounting portion, and thus, even if the coil that is in contact with the substantially pedestal-shaped protruding portion is pushed out toward the magnetic member and the coil is brought closer to the magnetic member, it is avoided that the coil is detached from the coil mounting portion provided with the coil.

In the holding member according an embodiment of the present invention, the detachment preventing portion is a substantially plate-shaped flange portion that prevents the coil formed by winding around the coil mounting portion from being unwound from the coil mounting portion, and the proximity facilitating portion is a substantially pedestal-shaped protruding portion provided in such a manner as to protrude from the holding member main body provided with the coil toward the outside of the holding member main body. Therefore, the magnetic field generated from the magnetic member can be efficiently utilized and the sensitivity of the coil to the magnetic member can be improved. The substantially pedestal-shaped protruding portion is provided in such a manner as to protrude from the holding member main body provided with the coil toward the outside of the holding member main body, and thus, when the holding member main body is provided with the coil, the coil that is in contact with the substantially pedestal-shaped protruding portion is pushed out toward the magnetic member. As a result, the coil is brought closer to the magnetic member. Therefore, the sensitivity of the coil provided on the holding member to the magnetic member is improved. The holding member includes the substantially plate-shaped flange portion that prevents the coil formed by winding around the coil mounting portion from being unwound from the coil mounting portion, and thus, even if the coil that is in contact with the substantially pedestal-shaped protruding portion is pushed out toward the magnetic member and the coil is brought closer to the magnetic member, it is avoided that the coil is detached from the coil mounting portion provided with the coil.

The holding member according to an embodiment of the present invention includes the coil mounting portion that allows a conductor capable of being energized to wind therearound, wherein when the coil is made up by winding the conductor around the coil mounting portion, the proximity facilitating portion is provided with a winding facilitating portion that facilitates the winding of the conductor around the coil mounting portion. Therefore, when the coil is made up by winding the conductor around the coil mounting portion of the holding member, the coil is easily made up. Since the proximity facilitating portion is provided with the winding facilitating portion that facilitates the winding of the conductor around the coil mounting portion, a conductor winding operation is easily performed when the coil is made up around the coil mounting portion. Since the conductor winding operation is easily performed in the coil mounting portion of the holding member, the cost for the conductor winding operation is kept lower to achieve cost reduction.

In the holding member according an embodiment of the present invention, the winding facilitating portion is an inclined surface portion that facilitates guiding of the conductor onto the outermost surface portion of the proximity facilitating portion when the conductor is placed along the outermost surface portion of the proximity facilitating portion. Therefore, the coil is easily made up around the coil mounting portion of the holding member. When the conductor is placed along the outermost surface portion of the proximity facilitating portion, since the conductor is guided onto the outermost surface portion of the proximity facilitating portion while the conductor is brought in sliding contact with the inclined surface portion of the proximity facilitating portion, the conductor winding operation is easily performed when the coil is made up around the coil mounting portion of the holding member. Therefore, the cost for the conductor winding operation is kept lower in the coil mounting portion of the holding member.

A driving apparatus according to an embodiment of the present invention at least includes any of the holding members as described above, a coil provided on the holding member, and a magnetic member facing the coil. Therefore, such a driving apparatus is configured that the magnetic field generated from the magnetic member is efficiently utilized and the sensitivity of the coil to the magnetic member is improved. When the proximity facilitating portion of the holding member is provided with the coil, the coil is brought closer to the magnetic member by the proximity facilitating portion, and thus, the sensitivity of the coil to the magnetic member is improved. When electricity is passed through the coil facing closely to the magnetic member, the holding member including the coil is efficiently driven.

A pickup apparatus according to an embodiment of the present invention at least includes any of the holding members as described above, a lens provided on the holding member, a coil provided on the holding member, and a magnetic member facing the coil. Therefore, such a pickup apparatus is configured that the magnetic field generated from the magnetic member is efficiently utilized and the sensitivity of the coil to the magnetic member is improved. When the proximity facilitating portion of the holding member is provided with the coil, the coil is brought closer to the magnetic member by the proximity facilitating portion, and thus, the sensitivity of the coil to the magnetic member is improved. Since electricity is passed through the coil facing closely to the magnetic member, the holding member including the lens and the coil is efficiently driven.

A disc apparatus according to an embodiment of the present invention includes a pickup apparatus as described above.

The above configuration enables to make up the disc apparatus including such a pickup apparatus that the sensitivity of the coil to the magnetic member is improved.

An embodiment of a holding member, a driving apparatus, a pickup apparatus, and a disc apparatus according to an embodiment of the present invention will now be described in detail with reference to the drawings.

As depicted in FIG. 1, in a holding member assembly 100 including a first holding member 10 and a second holding member 60, a driving apparatus 5 including the holding member assembly 100, and a pickup apparatus 3 including the driving apparatus 5, a direction D3, in which a pair of coils 40, 40 is disposed in parallel, is defined as a back-and-forth direction D3, for example. A direction D2, in which a pair of coils 70, 70 is disposed in parallel, is defined as a left-and-right direction D2, for example. A direction D1, which is substantially orthogonal to the back-and-forth direction D3 and the left-and-right direction D2, is defined as an up-and-down direction D1, for example. The definitions of "up", "down", "left", "right", "forth", and "back" in this application are definitions for convenience of description of the holding member assembly 100 including the first holding member 10 and the second holding member 60, the driving apparatus 5 including the holding member assembly 100, the pickup apparatus 3 including the driving apparatus 5, and a disc apparatus 1 including the pickup apparatus 3.

For example, when employing the holding member assembly 100 including the first holding member 10 and the second holding member 60, the driving apparatus 5, the pickup apparatus 3, and the disc apparatus 1 depicted in diagrams, the holding member assembly 100 including the first holding member 10 and the second holding member 60, the driving apparatus 5, the pickup apparatus 3, and the disc apparatus 1 may be placed in a substantially vertical direction at substantially 90 degrees, so that the holding member assembly 100 including the first holding member 10 and the second holding member 60, the driving apparatus 5, the pickup apparatus 3, and the disc apparatus 1 may be used in a substantially vertical placement state.

Figure 6:
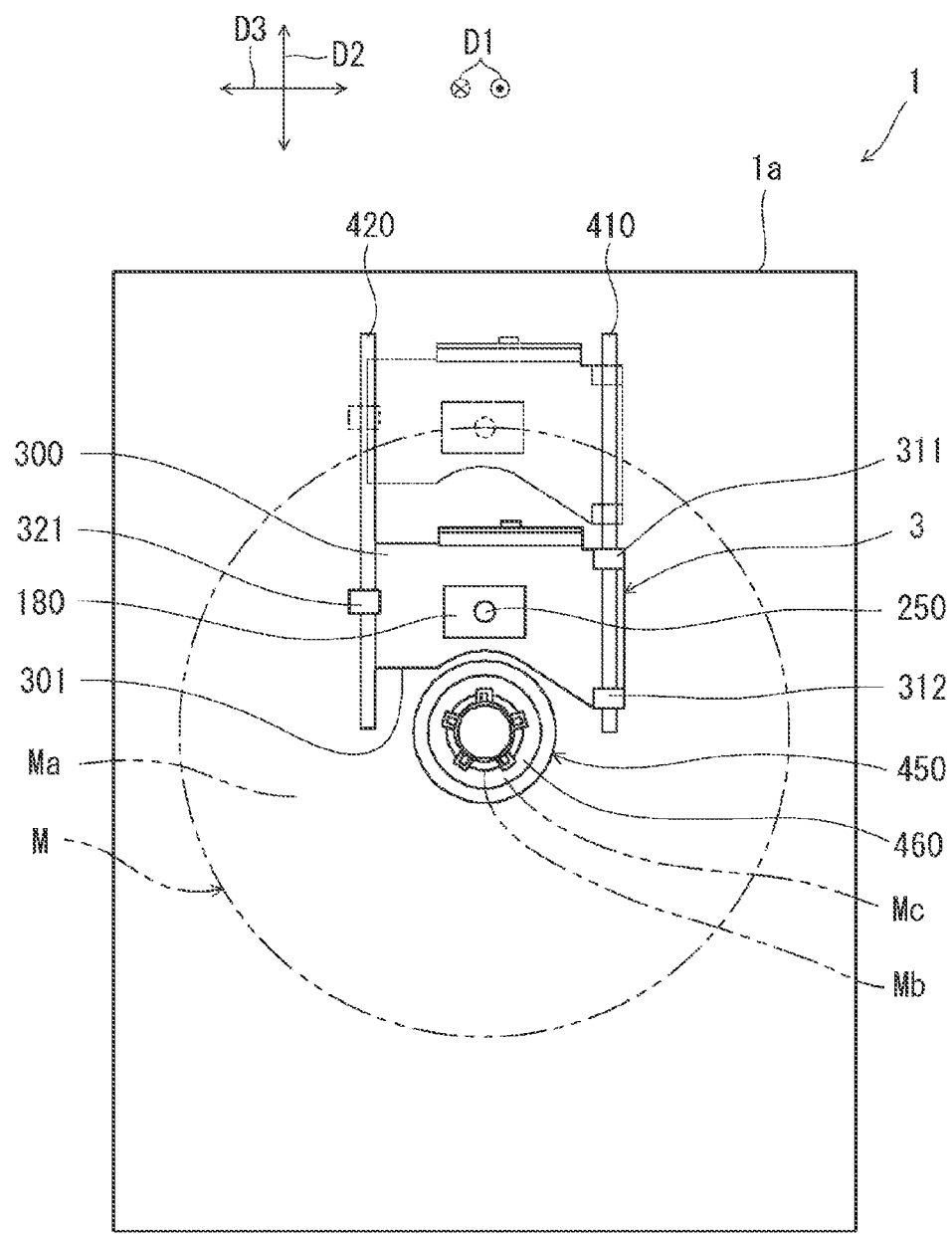
FIG. 6 is an explanatory view of a disc apparatus according to an embodiment of the present invention.
Figure 7:
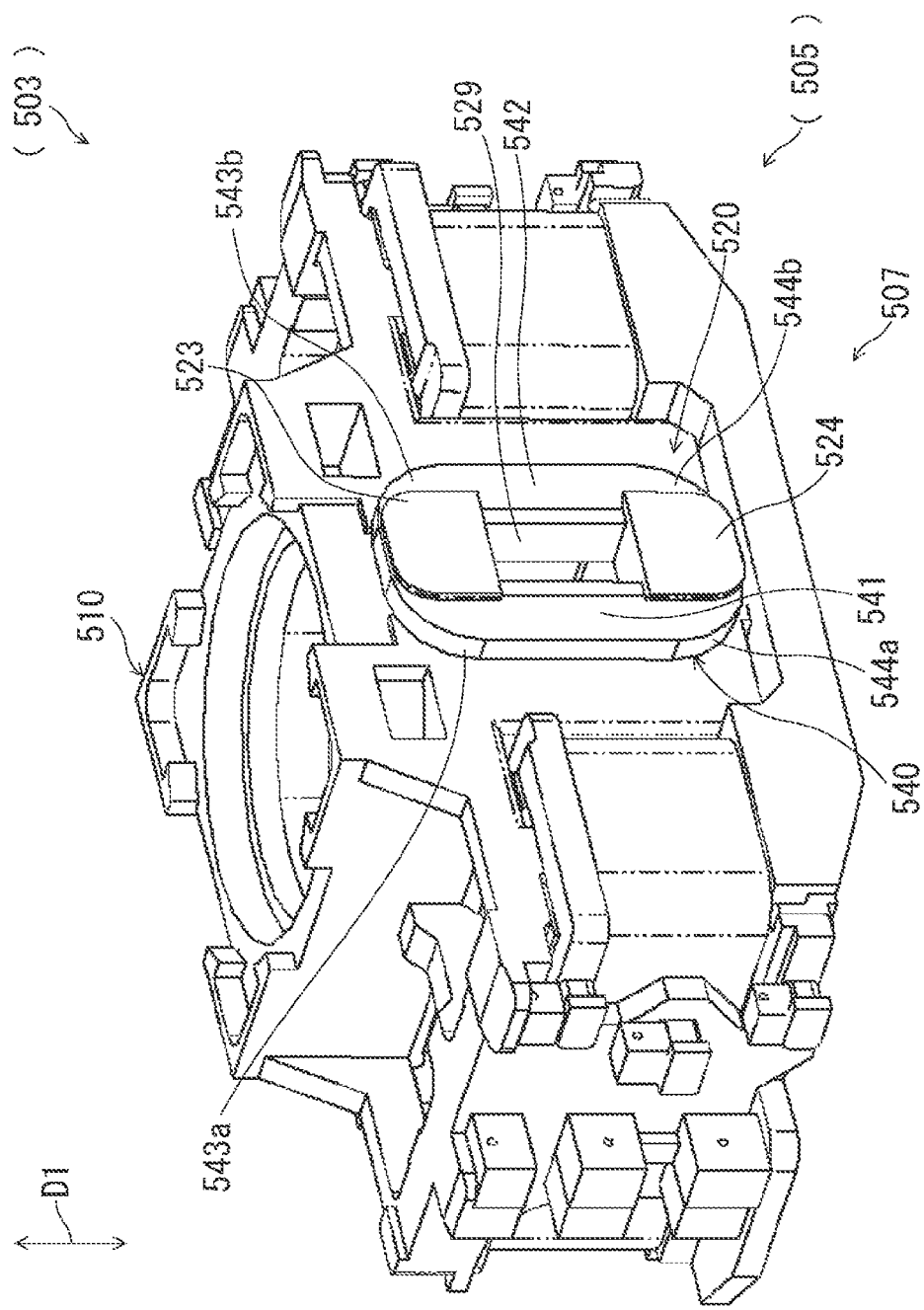
FIG. 7 is a perspective view of an embodiment of a holding member, driving apparatus, and pickup apparatus.
Figure 8:
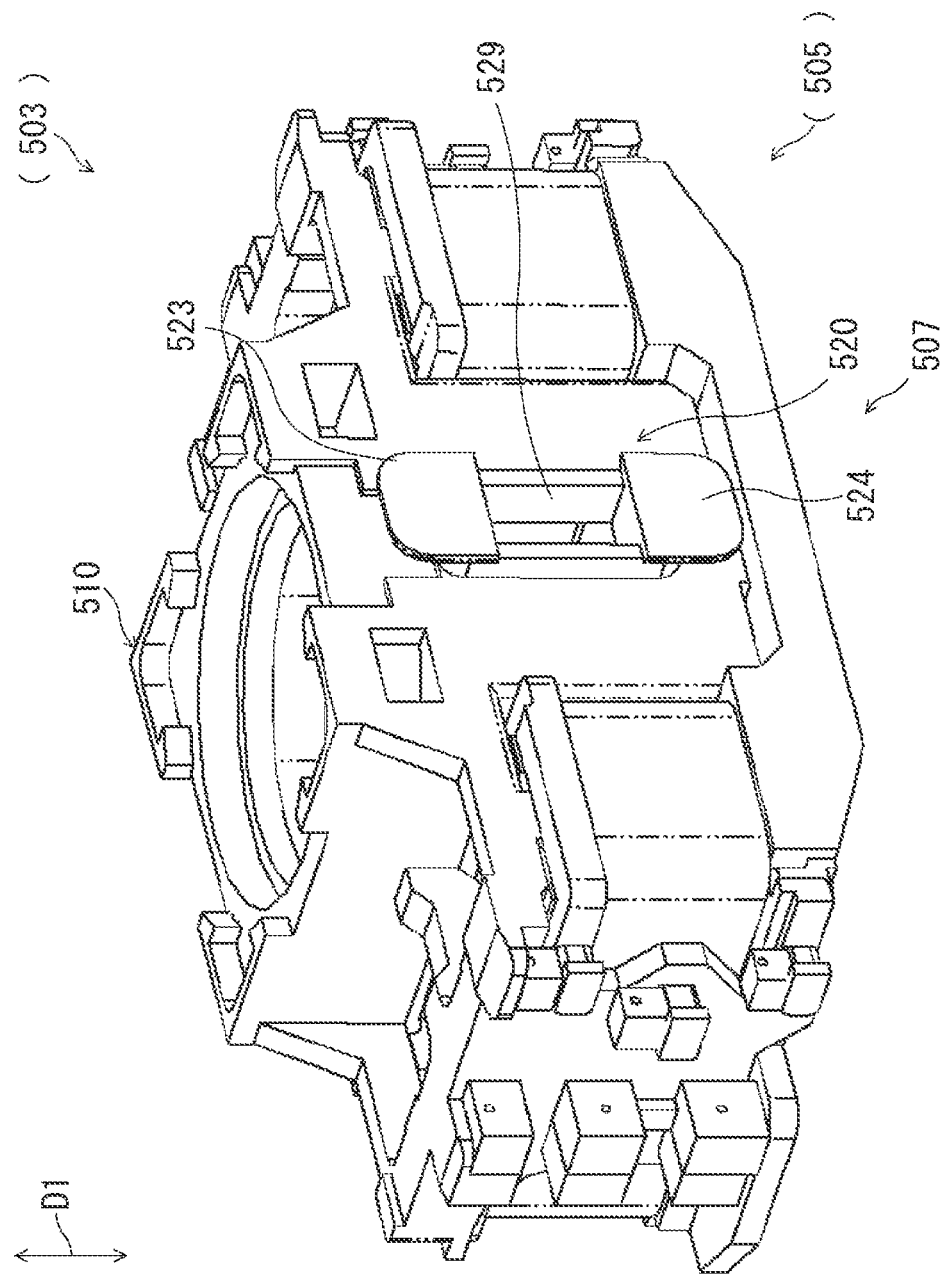
FIG. 8 is a perspective view of a holding member.

A disc M depicted in FIG. 6 is configured as an optical disc M, in which data/information/signals are read therefrom, data/information/signals are written thereinto, and data/information/signals are erased with a laser beam, for example. The disc apparatus 1 is configured as the optical disc apparatus 1 compatible with the optical disc M. The pickup apparatus 3 is configured as the optical pickup apparatus 3 compatible with the optical disc M. A lens 250 provided on the optical pickup apparatus 3 is formed as the objective lens 250 compatible with the optical disc M.

Data such as information recorded in the medium M including the optical disc M is reproduced with the laser beam condensed by the objective lens 250 of the optical pickup apparatus 3 provided on the optical disc apparatus 1. Data such as information is recorded into the medium M including the optical disc M by the laser beam condensed by the objective lens 250 of the optical pickup apparatus 3 provided on the optical disc apparatus 1. Data such as information recorded in the medium M including the optical disc M is erased with the laser beam condensed by the objective lens 250 of the optical pickup apparatus 3 provided on the optical disc apparatus 1. When these are performed, the driving apparatus 5 of the optical pickup apparatus 3 drives the objective lens 250 provided on a lens mounting unit 15 of the holding member 10 substantially along the up-and-down direction D1 or the left-and-right direction D2.

The medium means a disc, etc., that store information, for example. The optical pickup apparatus 3 built into the optical disc apparatus 1 is used to reproduce or record data such as information for the optical disc M. The disc M includes an optical disc of the "CD" series, an optical disc of the "DVD" (registered trademark) series, an optical disc of the "HD DVD" (registered trademark) series, or an optical disc of the "Blu-ray Disc" (registered trademark) series, for example. "CD" is an abbreviation for "Compact Disc" (trademark). "DVD" is an abbreviation for "Digital Versatile Disc" (registered trademark). "HD DVD" is an abbreviation for "High Definition DVD" (registered trademark).

The disc may be such an optical disc (not depicted) provided with signal surfaces on both sides of the disc and capable of writing/erasing data and/or rewriting data, for example. The disc may be such an optical disc (not depicted) provided with a two-layer signal surface and capable of writing/erasing data and/or rewriting data, for example. The disc may be such an "HD DVD" optical disc (not depicted) provided with a three-layer signal surface and capable of writing/erasing data and/or rewriting data, for example. The disc may be such a "Blu-ray Disc" optical disc (not depicted) provided with a four-layer signal surface and capable of writing/erasing data and/or rewriting data, for example. The disc may be such an optical disc (not depicted) capable of various types of writing of a label, etc., with application of a laser beam onto the label surface side of the disc, for example. A signal layer Ma of the optical disc M is made up of a metal layer, etc., such as a metallic thin film, for example. Information, data, etc., are recorded on the signal layer Ma made up of a metallic thin film, etc.

Information is recorded in the optical disc M or information recorded in the optical disc M is reproduced with a laser beam emitted from a light-emitting element 210 by supplying an electric current to the light-emitting element 210. Information is recorded in the optical disc M or information recorded in the optical disc M is reproduced with a laser beam emitted from a light-emitting element 220 by supplying an electric current to the light-emitting element 220.

The objective lens 250 of the optical pickup apparatus 3 is moved vertically/laterally by using the driving apparatus 5 of the optical pickup apparatus 3, so as to focus the laser beam on the signal layer Ma of the optical disc M. When a highly accurate laser spot is applied to be formed on the signal layer Ma of the optical disc M, the driving apparatus 5 of the optical pickup apparatus 3 moves the objective lens 250 provided on a lens mounting unit 15 of the holding member 10 substantially along the focusing direction D1, the tracking direction D2, etc. When the laser beam is focused with the objective lens 250, the optical pickup apparatus 3 performs the focusing adjustment, the tracking adjustment, and the tilt adjustment as needed. The focusing adjustment, the tracking adjustment, and the tilt adjustment are substantially concurrently performed, for example.

The focus means a focal point or a focal point of a lens, for example. The focusing means bringing into focus or being brought into focus. The track means a track of signals on the optical disc, for example. The tracking means to track minute signal portions provided on the signal layer of the optical disc by using light to determine a position of a substantially spiral track. The tilt in the optical disc apparatus or the optical pickup apparatus means an angular deviation between the disc surface and the light axis of the objective lens.

For example, when focus servo of the holder assembly 100 including the lens holder 10 provided with the objective lens 250 is performed for the optical disc M, the holder assembly 100 including the lens holder 10 provided with the objective lens 250 is moved along the up-and-down direction D1. When tracking servo of the holder assembly 100 including the lens holder 10 provided with the objective lens 250 is performed for the optical disc M, the holder assembly 100 including the lens holder 10 provided with the objective lens 250 is moved along the left-and-right direction D2. A servo or a servo mechanism means a mechanism for measuring a state of an object to be controlled and comparing such measurements with a reference value, to automatically perform corrective control.

An optical pickup is generally abbreviated as "OPU". An "optical pickup unit" may also be abbreviated as "OPU".

Here, the optical pickup apparatus is abbreviated as "OPU" for convenience, for example. An objective lens is abbreviated as "OBL", for example. The driving apparatus 5 making up the optical pickup apparatus 3 is configured as the actuator 5, for example. An actuator means a driving apparatus that converts energy into translational motion or rotary motion, for example. When the laser beam condensed with the OBL 250 is focused on the signal layer Ma of the optical disc M, the holder assembly 100 including the lens holder 10 provided with the OBL 250 is vertically and laterally driven by the actuator 5.

The OBL 250 is made of a synthetic resin material which is substantially transparent or semi-transparent, injection-moldable, and thermoplastic, for example. Alternatively, the OBL 250 is made of a glass material which is substantially transparent or semi-transparent. The single OBL 250 is fixed to the lens mounting unit 15 of the holding member by using an adhesive, for example. Depending on the designs/specifications, etc., of the OPU 3, the actuator 5, etc., for example, two or more OBL may be disposed on a holding member (not depicted).

Figure 2:
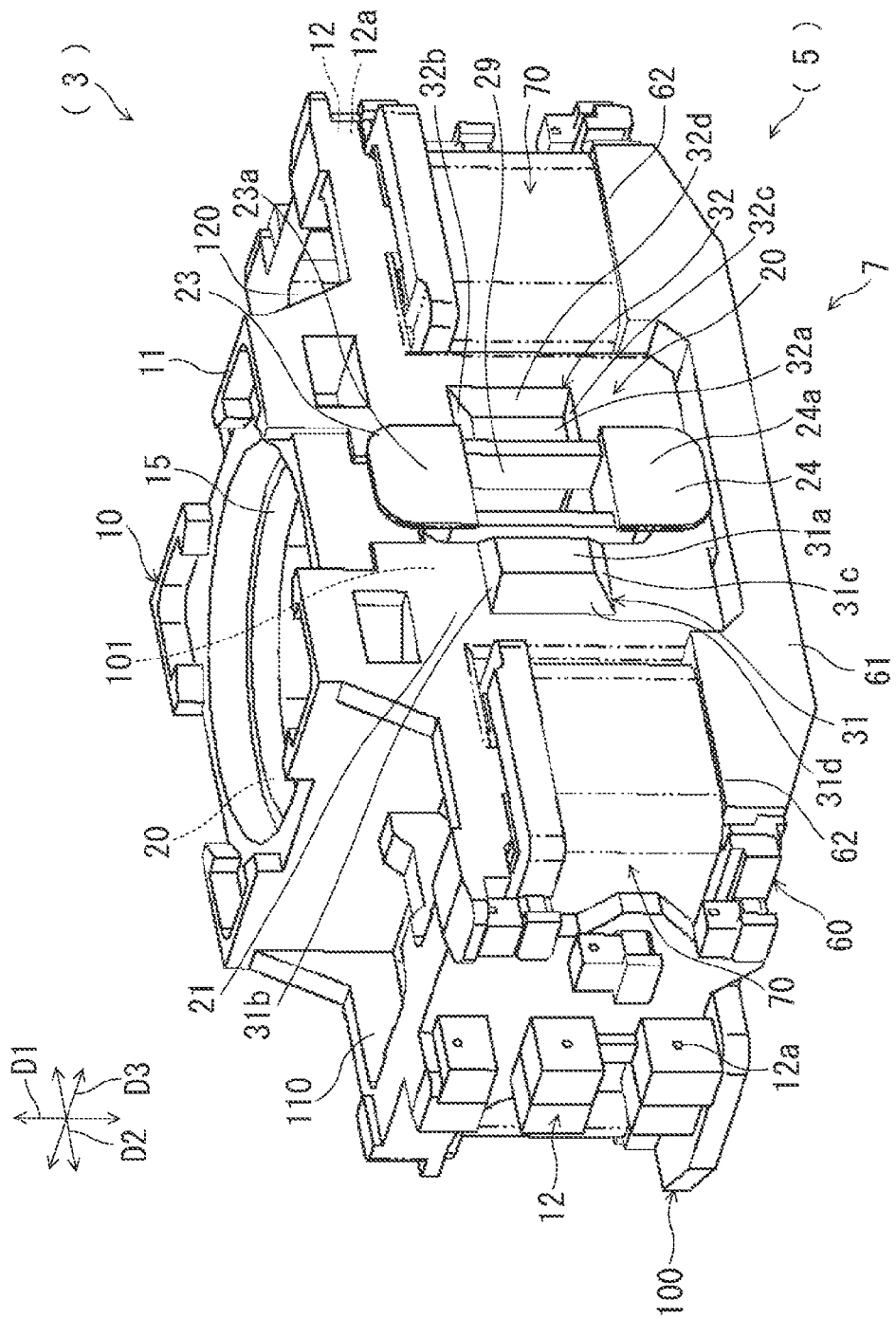
FIG. 2 is a perspective view of a holding member according an embodiment of to the present invention.

The first holding member 10 depicted in FIGS. 1 and 2 is the first holder 10 made of a heat-resistant synthetic resin material which is injection-moldable and thermoplastic and contains an aromatic ring, for example. A holding member main body 11 making up a major portion of the holding member 10 is the holder main body 11, which is made of the heat-resistant synthetic resin, making up the intricately structured holder 10, for example. The second holding member 60 is the second holder 60 made of a heat-resistant synthetic resin material which is injection-moldable and thermoplastic and contains an aromatic ring, for example. A holding member main body 61 making up a major portion of the holding member 60 is the holder main body 61, which is made of the heat-resistant synthetic resin, making up the intricately structured holder 60, for example.

The holder assembly 100, so-called holder member assembly 100 is made up by assembling the second holder 60 into the first holder 10 to combine the first holder 10 and the second holder 60. The holder assembly 100 has a two-piece structure having the first holder 10 of a one-piece structure and the second holder 60 of a one-piece structure, for example. Depending on the designs/specifications, etc., of the OPU 3, the actuator 5, etc., a holder of a one-piece structure (not depicted) is usable that is made up as one member instead of one of a two-piece structure, for example.

Figure 3:
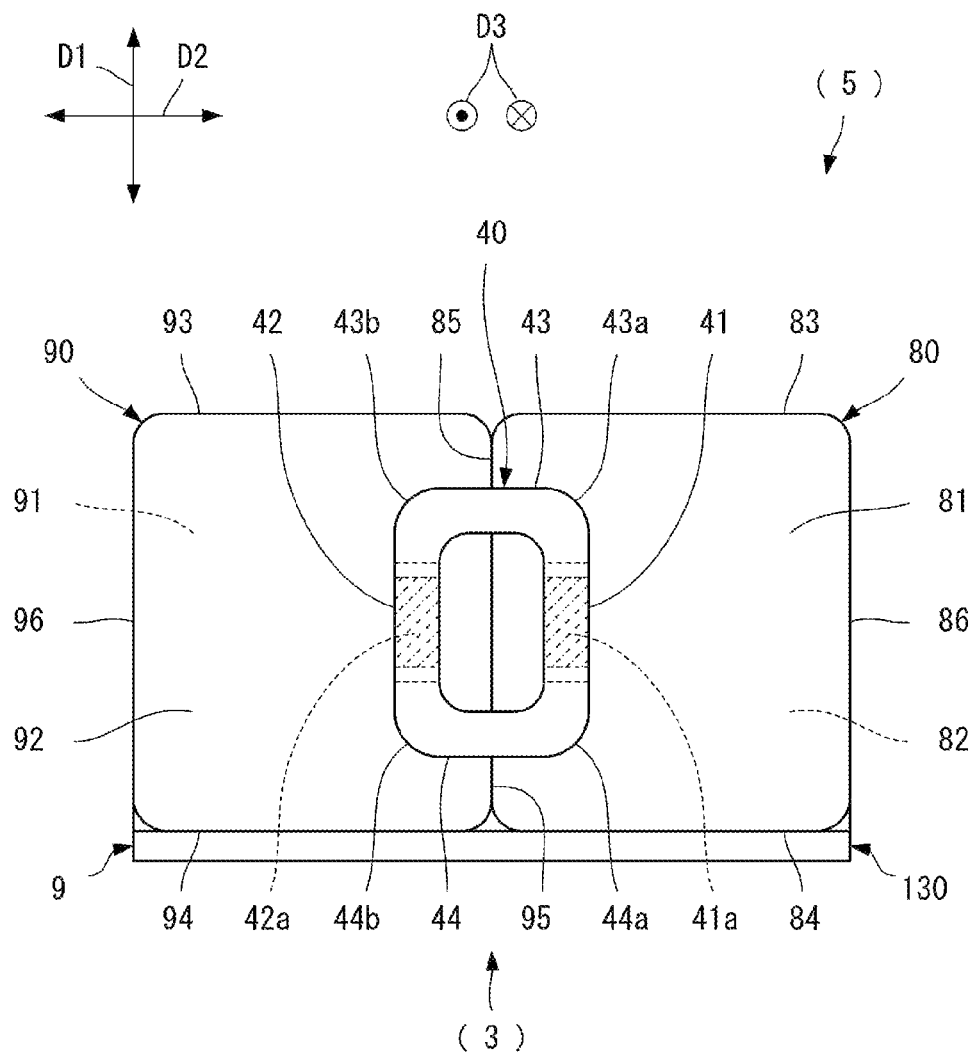
FIG. 3 is an explanatory diagram of a portion of a driving apparatus according to an embodiment of the present invention.
Figure 4:
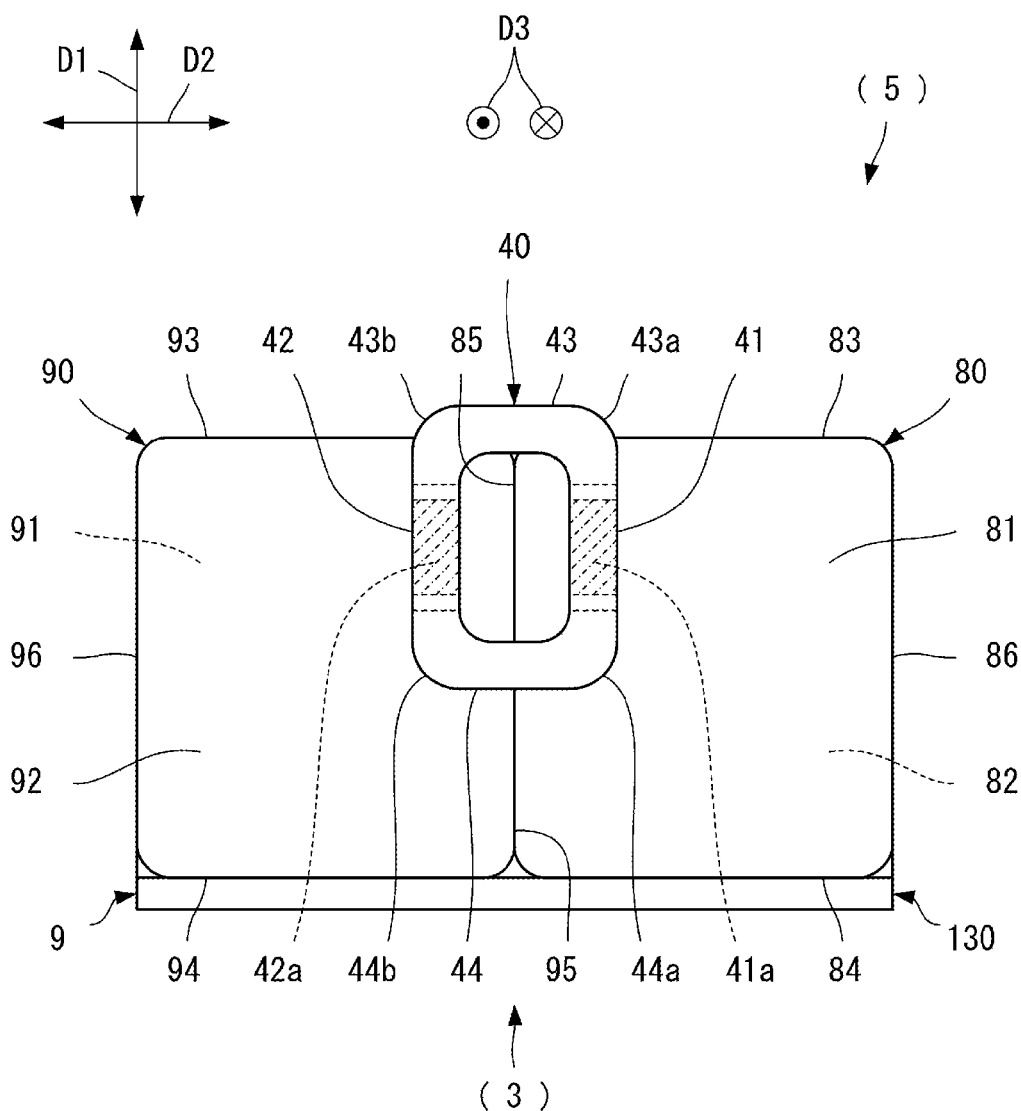
FIG. 4 is an explanatory diagram of a portion of a driving apparatus according to an embodiment of the present invention.

The coils 40, 70 depicted in FIGS. 1, 3, and 4 are made up by winding a small-diameter conductor, which is made of a material including light metal such as an aluminum material or an aluminum alloy material and coated with/protected by an insulation material such as an enamel material, for example. The first coil 40 is defined as the tracking coil 40 and the second coil 70 is defined as the focusing coil 70.

The holder assembly 100 including the lens holders 10, 60 provided with the OBL 250 and the coils 40, 40, 70, 70 is elastically supported in a movable manner by a plurality of supporting members 50, so-called suspension wires 50. The metal suspension wires 50 are connected electrically and attached to a control board 150, so-called circuit board 150 provided with circuit conductors.

The magnetic members 80, 90 depicted in FIGS. 3 and 4 are the magnets 80, 90 made by using ferrite magnets including iron oxide, barium, and strontium, for example. Alternatively, the magnetic members 80, 90 are the magnets 80, 90 made by using rare-earth/alloy magnets, or magnet steel including iron, chromium, cobalt, samarium, neodymium, and boron, for example.

The first magnet 80 in a substantially rectangular flat plate shape includes a substantially rectangular positive pole surface portion 81 that is the north-pole surface, a substantially rectangular negative pole surface portion 82 that is the south-pole surface on the opposite side of the positive pole surface portion 81, and four substantially rectangular end surface portions 83, 84, 85, 86 that are substantially orthogonal to the substantially rectangular positive pole surface portion 81 and the substantially rectangular negative pole surface portion 82. As such, the first magnet 80 in a substantially rectangular flat plate shape is formed in a flat substantially rectangular parallelepiped shape including at least six surface portions 81, 82, 83, 84, 85, 86.

The second magnet 90 in a substantially rectangular flat plate shape includes a substantially rectangular positive pole surface portion 91 that is the north-pole surface, a substantially rectangular negative pole surface portion 92 that is the south-pole surface on the opposite side of the positive pole surface portion 91, and four substantially rectangular end surface portions 93, 94, 95, 96 that are substantially orthogonal to the substantially rectangular positive pole surface portion 91 and the substantially rectangular negative pole surface portion 92. As such, the second magnet 90 in a substantially rectangular flat plate shape is formed in a flat substantially rectangular parallelepiped shape including at least six surface portions 91, 92, 93, 94, 95, 96.

The first magnet 80 in a substantially rectangular flat plate shape and the second magnet 90 in a substantially rectangular flat plate shape are disposed side-by-side, such that the one end surface portion 85 of the first magnet 80 in a substantially rectangular flat plate shape and the one end surface portion 95 of the second magnet 90 in a substantially rectangular flat plate shape are joined to form a substantially one surface out of the substantially rectangular positive pole surface portion 81 of the first magnet 80 in a substantially rectangular flat plate shape and the substantially rectangular negative pole surface portion 92 of the second magnet 90 in a substantially rectangular flat plate shape.

A magnetic coupling member 130 depicted in FIGS. 3 and 4, which is a frame yoke 130, for example, is made of a metal material attracted by the magnetic members 80, 90 such as the magnets 80, 90. The magnets 80, 90 are mounted on the frame yoke 130 by the magnetism/magnetic force generated by the magnets 80, 90 and an adhesive. A yoke means an object for structurally supporting a magnetic linkage, for example. A yoke is considered to be an object for reducing leakage of a magnetic force generated from a magnetic member such as a magnet. A frame means a frame, a framework, and a framing, for example. The frame yoke 130 is formed as a frame having a function as a yoke. The frame yoke 130 is made of a metal material and formed by press working of a metal material plate, for example.

The coil 40 (FIGS. 1, 3, and 4) is made up by directly winding a substantially linear conductor around a coil mounting portion 20 of the holder 10 (FIG. 2). By directly winding a substantially linear conductor around the coil mounting portion 20 of the holder 10 (FIG. 2), the substantially flat-plate-shaped coil 40 in a substantially rectangular annular shape is made up, including a pair of left and right vertically elongated long side portions 41, 42 (FIGS. 1, 3, and 4) and a pair of upper and lower short side portions 43, 44 linking a pair of the left and right vertically elongated long side portions 41, 42.

A movable unit 7 of the actuator 5 is made up of the first holder 10, the second holder 60, the holder assembly 100 made up by assembling the first holder 10 and the second holder 60, the coils 40, 40, 70, 70, and the suspension wires

50. A fixed unit 9 of the actuator 5 is made up of the magnets 80, 90 and the frame yoke 130.

As depicted in FIGS. 1 and 2, the first holder 10 is the intricately shaped holder 10 provided with a plurality of the substantially flat-plate-shaped coils 40 (FIG. 1) in a substantially rectangular annular shape that is made up by winding the electrically conductive substantially linear conductors around a plurality of the intricately structured coil mounting portions 20 (FIGS. 1 and 2). The first holder 10 at least includes a pair of left and right proximity facilitating portions 31, 32 (FIGS. 1 and 2) that is enable a pair of the left and right effective length portions 41, 42 of the substantially flat-plate-shaped coil 40 in a substantially rectangular annular shape is brought closer to a pair of the left and right substantially rectangular flat-plate-shaped magnets 80, 90 facing the substantially flat-plate-shaped coil 40 (FIGS. 3 and 4) in a substantially rectangular annular shape.

Specifically, the first holder 10 includes the one proximity facilitating portion 31 (FIGS. 1 and 2) capable of bringing the one effective length portion 41 of the substantially flat-plate-shaped coil 40 in a substantially rectangular annular shape closer to the one substantially rectangular flat-plate-shaped magnet 80 facing the substantially flat-plate-shaped coil 40 (FIGS. 3 and 4) in a substantially rectangular annular shape. The first holder 10 also includes the other proximity facilitating portion 32 (FIGS. 1 and 2) capable of bringing the other effective length portion 42 of the substantially flat-plate-shaped coil 40 in a substantially rectangular annular shape closer to the other substantially rectangular flat-plate-shaped magnet 90 facing the substantially flat-plate-shaped coil 40 (FIGS. 3 and 4) in a substantially rectangular annular shape.

If the holder 10 depicted in FIGS. 1 and 2 is made up, the magnetic field generated by the magnets 80, 90 is efficiently utilized and the sensitivity of the coil 40 to the magnets 80, 90 is improved. When a pair of the left and right proximity facilitating portions 31, 32 of the intricately structured holder 10 is provided with the substantially flat-plate-shaped coil 40 in a substantially rectangular annular shape, a pair of the left and right proximity facilitating portions 31, 32 brings a pair of the left and right effective length portions 41, 42 of the substantially flat-plate-shaped coil 40 in a substantially rectangular annular shape closer to a pair of the left and right substantially rectangular flat-plate-shaped magnets 80, 90, and thus, the sensitivity of the coil 40 to the magnets 80, 90 is improved.

When a pair of the left and right proximity facilitating portions 31, 32 of the intricately structured holder 10 is provided with the substantially flat-plate-shaped coil 40 in a substantially rectangular annular shape, the one proximity facilitating portion 31 brings the one effective length portion 41 of the substantially flat-plate-shaped coil 40 in a substantially rectangular annular shape closer to the one substantially rectangular flat-plate-shaped magnet 80, and the other proximity facilitating portion 32 brings the other effective length portion 42 of the substantially flat-plate-shaped coil 40 in a substantially rectangular annular shape closer to the other substantially rectangular flat-plate-shaped magnet 90, and thus, the sensitivity is improved in the substantially flat-plate-shaped coil 40 in a substantially rectangular annular shape to a pair of the substantially rectangular flat-plate-shaped magnets 80, 90 that are disposed side-by-side.

As depicted in FIGS. 3 and 4, in order to enable a pair of the left and right effective length portions 41, 42 of the substantially flat-plate-shaped coil 40 in a substantially rectangular annular shape to be brought closer to a pair of the left and right substantially rectangular flat-plate-shaped magnets 80, 90 facing the substantially flat-plate-shaped coil 40 in a substantially rectangular annular shape, as depicted in FIGS. 1 and 2, a pair of the left and right proximity facilitating portions 31, 32 provided on the holder main body 11 of the intricately structured holder 10 is formed as a pair of the left and right substantially pedestal-shaped substantially truncated-pyramidal-shaped protruding portions 31, 32 protruding from a reference surface portion 21 of the coil mounting portion 20 of the intricately structured holder main body 11 provided with the substantially flat-plate-shaped coil 40 (FIG. 1) in a substantially rectangular annular shape toward the outside of the intricately structured holder main body 11 (FIG. 2). The reference surface portion 21 of the coil mounting portion 20 of the holder main body 11 is a reference surface defined for convenience of description.

The intricately structured holder main body 11 is provided with a pair of the left and right substantially pedestal-shaped substantially truncated-pyramidal-shaped protruding portions 31, 32 (FIG. 2) capable of bringing a pair of the left and right effective length portions 41, 42 of the substantially flat-plate-shaped coil 40 (FIGS. 1, 3, and 4) in a substantially rectangular annular shape closer to a pair of the left and right substantially rectangular flat-plate-shaped magnets 80, 90 (FIGS. 3 and 4) facing the substantially flat-plate-shaped coil 40 (FIG. 1) in a substantially rectangular annular shape.

If the holder 10 depicted in FIGS. 1 and 2 is made up, the magnetic field generated by the magnets 80, 90 is efficiently utilized and the sensitivity of the coil 40 to the magnets 80, 90 may be improved. A pair of the left and right substantially pedestal-shaped substantially truncated-pyramidal-shaped protruding portions 31, 32 protrudes from the reference surface portion 21 of the coil mounting portion 20 of the intricately structured holder main body 11 provided with the coil 40 toward the outside of the intricately structured holder main body 11, and thus, when the coil mounting portion 20 of the holder main body 11 is provided with the coil 40, a pair of the left and right effective length portions 41, 42 of the substantially flat-plate-shaped coil 40 in a substantially rectangular annular shape that is in contact with a pair of the left and right substantially pedestal-shaped substantially truncated-pyramidal-shaped protruding portions 31, 32 is pushed out toward a pair of the left and right substantially rectangular flat-plate-shaped magnets 80, 90. As a result, a pair of the left and right effective length portions 41, 42 of the substantially flat-plate-shaped coil 40 in a substantially rectangular annular shape is brought closer to a pair of the left and right substantially rectangular flat-plate-shaped magnets 80, 90. Therefore, the sensitivity is improved in the substantially flat-plate-shaped coil 40 in a substantially rectangular annular shape provided on the intricately structured holder 10 to a pair of the left and right substantially rectangular flat-plate-shaped magnets 80, 90.

As depicted in FIGS. 3 and 4, in order to enable a pair of the left and right effective length portions 41, 42 of the substantially flat-plate-shaped coil 40 in a substantially rectangular annular shape to be brought closer to a pair of the left and right substantially rectangular flat-plate-shaped magnets 80, 90 facing the substantially flat-plate-shaped coil 40 in a substantially rectangular annular shape, as depicted in FIGS. 1 and 2, a pair of the left and right proximity facilitating portions 31, 32 provided on the holder main body 11 of the intricately structured holder 10 is formed as a pair of the left and right substantially pedestal-shaped substantially truncated-pyramidal-shaped protruding portions 31, 32 that is provided in such a manner as to protrude from the intricately structured holder main body 11 provided with the substantially flat-plate-shaped coil 40 (FIG. 1) in a substantially rectangular annular shape (FIG. 2) toward the outside of the intricately structured holder main body 11.

If the holder 10 depicted in FIGS. 1 and 2 is made up, the magnetic field generated by the magnets 80, 90 is efficiently utilized and the sensitivity of the coil 40 to the magnets 80, 90 may be improved. A pair of the left and right substantially pedestal-shaped substantially truncated-pyramidal-shaped protruding portions 31, 32 is provided in such a manner as to protrude from the intricately structured holder main body 11 provided with the coil 40 toward the outside of the intricately structured holder main body 11, and thus, when the holder main body 11 is provided with the coil 40, a pair of the left and right effective length portions 41, 42 of the substantially flat-plate-shaped coil 40 in a substantially rectangular annular shape that is in contact with a pair of the left and right substantially pedestal-shaped substantially truncated-pyramidal-shaped protruding portions 31, 32 is pushed out toward a pair of the left and right substantially rectangular flat-plate-shaped magnets 80, 90. As a result, a pair of the left and right effective length portions 41, 42 of the substantially flat-plate-shaped coil 40 in a substantially rectangular annular shape is brought closer to a pair of the left and right substantially rectangular flat-plate-shaped magnets 80, 90. Therefore, the sensitivity is improved in the substantially flat-plate-shaped coil 40 in a substantially rectangular annular shape provided on the intricately structured holder 10 to a pair of the left and right substantially rectangular flat-plate-shaped magnets 80, 90.

As depicted in FIG. 1, the coil 40 provided on the intricately constructed holder main body 11 is made up as the substantially flat-plate-shaped coil 40 in a substantially rectangular annular shape. A pair of the left and right vertically elongated proximity facilitating protruding portions 31, 32 is provided on the intricately structured holder main body 11 provided with the substantially flat-plate-shaped coil 40 in a substantially rectangular annular shape, substantially corresponding to a pair of the left and right vertically elongated effective length portions 41, 42 of the substantially flat-plate-shaped coil 40 in a substantially rectangular annular shape (FIGS. 1 and 2).

If the coil 40 and the holder 10 are made up as such, the change in the sensitivity may be reduced in the substantially flat-plate-shaped coil 40 in a substantially rectangular annular shape to a pair of the left and right substantially rectangular flat-plate-shaped magnets 80, 90 and the change in the force application point may be reduced in the substantially flat-plate-shaped coil 40 in a substantially rectangular annular shape. A pair of the left and right vertically elongated proximity facilitating protruding portions 31, 32 is provided on the intricately constructed holder main body 11 provided with the substantially flat-plate-shaped coil 40 in a substantially rectangular annular shape, substantially corresponding to a pair of the left and right vertically elongated effective length portions 41, 42 of the substantially flat-plate-shaped coil 40 in a substantially rectangular annular shape, and thus, when the intricately constructed holder main body 11 is provided with the substantially flat-plate-shaped coil 40 in a substantially rectangular annular shape, a space is reduced between a pair of the left and right effective length portions 41, 42 of the substantially flat-plate-shaped coil 40 in a substantially rectangular annular shape that is in contact with a pair of the left and right substantially pedestal-shaped substantially truncated-pyramidal-shaped proximity facilitating protruding portions 31, 32 and a pair of the left and right substantially rectangular flat-plate-shaped magnets 80, 90. A pair of the left and right effective length portions 41, 42 of the substantially flat-plate-shaped coil 40 in a substantially rectangular annular shape is brought closest to a pair of the left and right substantially rectangular flat-plate-shaped magnets 80, 90. Correspondingly, the change in the sensitivity is reduced in the substantially flat-plate-shaped coil 40 in a substantially rectangular annular shape to a pair of the left and right substantially rectangular flat-plate-shaped magnets 80, 90, and the change in the force application point is reduced in the substantially flat-plate-shaped coil 40 in a substantially rectangular annular shape. When electricity is passed through the substantially flat-plate-shaped coil 40 in a substantially rectangular annular shape to drive, for example, along the left-and-right direction D2, the intricately structured holder 10 provided with the substantially flat-plate-shaped coil 40 in a substantially rectangular annular shape facing a pair of the left and right substantially rectangular flat-plate-shaped magnets 80, 90 substantially, the greatest driving force is generated in a pair of the left and right effective length portions 41, 42 of the substantially flat-plate-shaped coil 40 in a substantially rectangular annular shape.

As depicted in FIGS. 1 and 2, the first holder 10 includes a pair of upper and lower detachment preventing portions 23, 24 that prevent the substantially flat-plate-shaped coil 40 in a substantially rectangular annular shape from being unwound, for example, and being accidentally detached from the intricately structured coil mounting portion 20 provided with the substantially flat-plate-shaped coil 40 (FIG. 1) in a substantially rectangular annular shape toward the outside of the intricately structured holder main body 11 having the coil mounting portion 20 (FIGS. 1 and 2). It is assumed that there are located on substantially the same virtual plane not depicted an outermost surface portion 23a of the upper detachment preventing portion 23 provided on the intricately structured coil mounting portion 20, an outermost surface portion 24a of the lower detachment preventing portion 24 provided on the intricately structured coil mounting portion 20, an outermost surface portion 41a of the substantially flat-plate-shaped left effective length portion 41 of the substantially flat-plate-shaped coil 40 in a substantially rectangular annular shape on an outermost surface portion 31a of the left proximity facilitating protruding portion 31 that is provided on the intricately structured holder main body 11, and an outermost surface portion 42a of the substantially flat-plate-shaped right effective length portion 42 of the substantially flat-plate-shaped coil 40 in a substantially rectangular annular shape on an outermost surface portion 32a of the right proximity facilitating protruding portion 32 that is provided on the intricately structured holder main body 11.

As a result, the magnetic field generated from the magnets 80, 90 is effectively utilized and the sensitivity of the coil 40 to the magnets 80, 90 may be improved. Here, the outermost surface portions 23a, 24a, 31a, 32a, 41a, and 42a in this specification indicates the surface portions 23a, 24a, 31a, 32a, 41a, and 42a of objects/objective parts, which are most distanced from a substantially center part 101 of the holder 10 or the holder assembly 100 including the holder 10 toward the outside of the holder 10/holder assembly 100, with respect to the objects/objective parts, using the substantially center part 101 of the holder 10/holder assembly 100 as a reference, for example. The substantially center part 101 of the holder 10 and the holder assembly 100 including the holder 10 is defined as the substantially center-of-gravity part 101 of the holder assembly 100, for example.

There are located on substantially the same virtual plane not depicted the outermost surface portion 23a of the upper detachment preventing portion 23 provided on the intricately structured coil mounting portion 20, the outermost surface portion 24a of the lower detachment preventing portion 24 provided on the intricately structured coil mounting portion 20, the outermost surface portion 41a of the substantially flat-plate-shaped left effective length portion 41 of the substantially flat-plate-shaped coil 40 in a substantially rectangular annular shape on the outermost surface portion 31a of the left proximity facilitating protruding portion 31 that is provided on the intricately structured holder main body 11, and the outermost surface portion 42a of the substantially flat-plate-shaped right effective length portion 42 of the substantially flat-plate-shaped coil 40 in a substantially rectangular annular shape on the outermost surface portion 32a of the right proximity facilitating protruding portion 32 that is provided on the intricately structured holder main body 11, and thus, it is avoided that an unnecessary clearance, so-called gap is created between a pair of the left and right substantially rectangular flat-plate-shaped magnets 80, 90 and the substantially flat-plate-shaped coil 40 in a substantially rectangular annular shape by the thickness of a pair of the upper and lower detachment preventing portions 23, 24. The gap is reduced between the one effective length portion 41 of the substantially flat-plate-shaped coil 40 in a substantially rectangular annular shape and the positive pole surface portion 81 of the one substantially rectangular flat-plate-shaped magnet 80, and the gap is reduced between the other effective length portion 42 of the substantially flat-plate-shaped coil 40 in a substantially rectangular annular shape and the negative pole surface portion 92 of the other substantially rectangular flat-plate-shaped magnet 90, and thus, the magnetic field generated from a pair of the left and right magnets 80/90 is effectively utilized and occurrence of the sensitivity loss is avoided in the magnets 80, 90, and the coil 40.

The coil mounting portion 20 of the holder main body 11 making up the holder 10 includes a pair of the upper and lower detachment preventing portions 23, 24 that prevent the substantially flat-plate-shaped coil 40 in a substantially rectangular annular shape, which is formed by winding around the coil mounting portion 20 of the intricately structured holder 10, from being unwound, for example, and detached from the intricately structured coil mounting portion 20, and thus, even if the substantially flat-plate-shaped coil 40 in a substantially rectangular annular shape is disposed on a pair of the left and right proximity facilitating protruding portions 31, 32 of the intricately structured holder 10, the one effective length portion 41 of the substantially flat-plate-shaped coil 40 in a substantially rectangular annular shape is brought closer to the one substantially rectangular flat-plate-shaped magnet 80 by the one proximity facilitating protruding portion 31, and the other effective length portion 42 of the substantially flat-plate-shaped coil 40 in a substantially rectangular annular shape is brought closer to the other substantially rectangular flat-plate-shaped magnet 90 by the other proximity facilitating protruding portion 32, it is avoided that the substantially flat-plate-shaped coil 40 in a substantially rectangular annular shape is unwound, for example, and accidentally detached from the intricately structured coil mounting portion 20 provided with the substantially flat-plate-shaped coil 40 in a substantially rectangular annular shape toward the outside of the intricately structured holder main body 11 including the coil mounting portion 20.

Depending on the designs/specifications, etc., of the OPU 3, the actuator 5, etc., for example, the outermost surface portion 31a of the left proximity facilitating portion 31, so-called proximity facilitating protruding portion 31 provided on the holder main body 11 may be defined as the reference surface portion 31a of the holder main body 11; the outermost surface portion 32a of the right proximity facilitating portion 32, so-called proximity facilitating protruding portion 32 provided on the holder main body 11 may be defined as the reference surface portion 32a of the holder main body 11; and the reference surface portion 21 of the holder main body 11 may be defined as the surface portion 21 for holding the coil 40. The definitions of the "reference surface portion", etc., in this specification are definitions for convenience of description of the holding member assembly 100 including the first holding member 10 and the second holding member 60, the driving apparatus 5 including the holding member assembly 100, the pickup apparatus 3 including the driving apparatus 5, and the disc apparatus 1 including the pickup apparatus 3.

As depicted in FIGS. 1 and 2, a pair of the upper and lower detachment preventing portions 23, 24 provided on the coil mounting portion 20 of the intricately structured holder 10 is formed as a pair of the upper and lower substantially rectangular flat-plate-shaped wire-wound flange portions 23, 24 that prevent the substantially flat-plate-shaped coil 40 (FIG. 1) in a substantially rectangular annular shape formed by winding around the intricately structured coil mounting portion 20 from being unwound and detached from the intricately structured coil mounting portion 20 (FIGS. 1 and 2). The coil mounting portion 20 of the holder 10 of a type as depicted in FIGS. 1 and 2 includes a pair of the upper and lower substantially rectangular flat-plate-shaped wire-wound flange portions 23, 24 that prevent the coil 40 formed by winding a conductor from being accidentally detached from a coil supporting unit 29 of the coil mounting portion 20. A pair of the left and right proximity facilitating protruding portions 31, 32 provided on the coil mounting portion 20 of the intricately structured holder 10 is formed as a pair of the left and right substantially rectangular pedestal-shaped proximity facilitating protruding portions 31/32 protruding from the reference surface portion 21 of the coil mounting portion 20 of the intricately structured holder main body 11 (FIGS. 1 and 2) provided with the substantially flat-plate-shaped coil 40 in a substantially rectangular annular shape toward the outside of the intricately structured holder main body 11, so as to enable a pair of the left and right vertically elongated effective length portions 41/42 of the substantially flat-plate-shaped coil 40 (FIGS. 1, 3, and 4) in a substantially rectangular annular shape to be brought closer to the pole surface portions 81/92 of a pair of the left and right substantially rectangular flat-plate-shaped magnets 80/90 (FIGS. 3 and 4), which faces the substantially flat-plate-shaped coil 40 (FIGS. 1, 3, and 4) in a substantially rectangular annular shape (FIG. 2).

If the holder 10 depicted in FIGS. 1 and 2 is made up, the magnetic field generated by the magnets 80, 90 is efficiently utilized and the sensitivity of the coil 40 to the magnets 80, 90 may be improved. The one substantially rectangular pedestal-shaped proximity facilitating protruding portion 31 protrudes from the reference surface portion 21 of the coil mounting portion 20 of the intricately structured holder main body 11 provided with the coil 40 toward the outside of the intricately structured holder main body 11, and thus, when the coil mounting portion 20 of the holder main body 11 is provided with the coil 40, the one vertically elongated effective length portion 41 of the substantially flat-plate-shaped coil 40 in a substantially rectangular annular shape that is in contact with the one substantially rectangular pedestal-shaped proximity facilitating protruding portion 31 is pushed out toward the positive pole surface portion 81 of the one substantially rectangular flat-plate-shaped magnet 80. As a result, the one vertically elongated effective length portion 41 of the substantially flat-plate-shaped coil 40 in a substantially rectangular annular shape is brought closer to the positive pole surface portion 81 of the one substantially rectangular flat-plate-shaped magnet 80. The other substantially rectangular pedestal-shaped proximity facilitating protruding portion 32 protrudes from the reference surface portion 21 of the coil mounting portion 20 of the intricately structured holder main body 11 provided with the coil 40 toward the outside of the intricately structured holder main body 11, and thus, when the coil mounting portion 20 of the holder main body 11 is provided with the coil 40, the other vertically elongated effective length portion 42 of the substantially flat-plate-shaped coil 40 in a substantially rectangular annular shape that is in contact with the other substantially rectangular pedestal-shaped proximity facilitating protruding portion 32 is pushed out toward the negative pole surface portion 92 of the other substantially rectangular flat-plate-shaped magnet 90. As a result, the other vertically elongated effective length portion 42 of the substantially flat-plate-shaped coil 40 in a substantially rectangular annular shape is brought closer to the negative pole surface portion 92 of the other substantially rectangular flat-plate-shaped magnet 90. Therefore, the sensitivity is improved in the substantially flat-plate-shaped coil 40 in a substantially rectangular annular shape, which is provided on the intricately structured holder 10, to a pair of the left and right substantially rectangular flat-plate-shaped magnets 80, 90.

The coil mounting portion 20 of the holder main body 11 making up the holder 10 includes a pair of the upper and lower substantially rectangular flat-plate-shaped wire-wound flange portions 23, 24 that prevent the substantially flat-plate-shaped coil 40 in a substantially rectangular annular shape formed by winding around the intricately structured coil mounting portion 20 from being unwound and detached from the intricately structured coil mounting portion 20, and thus, even if the one vertically elongated effective length portion 41 of the substantially flat-plate-shaped coil 40 in a substantially rectangular annular shape that is in contact with the one substantially rectangular pedestal-shaped proximity facilitating protruding portion 31 is pushed out toward the positive pole surface portion 81 of the one substantially rectangular flat-plate-shaped magnet 80 so that the one vertically elongated effective length portion 41 of the substantially flat-plate-shaped coil 40 in a substantially rectangular annular shape is brought closer to the positive pole surface portion 81 of the one substantially rectangular flat-plate-shaped magnet 80, and even if the other vertically elongated effective length portion 42 of the substantially flat-plate-shaped coil 40 in a substantially rectangular annular shape that is in contact with the other substantially rectangular pedestal-shaped proximity facilitating protruding portion 32 is pushed out toward the negative pole surface portion 92 of the other substantially rectangular flat-plate-shaped magnet 90 so that the other vertically elongated effective length portion 42 of the substantially flat-plate-shaped coil 40 in a substantially rectangular annular shape is brought closer to the negative pole surface portion 92 of the other substantially rectangular flat-plate-shaped magnet 90, it is avoided that the substantially flat-plate-shaped coil 40 in a substantially rectangular annular shape is unwound, for example, and accidentally detached from the intricately structured coil mounting portion 20 provided with the substantially flat-plate-shaped coil 40 in a substantially rectangular annular shape toward the outside of the intricately structured holder main body 11 including the coil mounting portion 20.

As depicted in FIGS. 1 and 2, a pair of the upper and lower detachment preventing portions 23, 24 provided on the coil mounting portion 20 of the intricately structured holder 10 is formed as a pair of the upper and lower substantially rectangular flat-plate-shaped wire-wound flange portions 23, 24 that prevent the substantially flat-plate-shaped coil 40 (FIG. 1) in a substantially rectangular annular shape formed by winding around the intricately structured coil mounting portion 20 from being unwound and detached from the intricately structured coil mounting portion 20 (FIGS. 1 and 2). The coil mounting portion 20 of the holder 10 of the type depicted in FIGS. 1 and 2 includes a pair of the upper and lower substantially rectangular flat-plate-shaped wire-wound flange portions 23, 24 that prevent the coil 40 formed by winding a conductor from being accidentally detached from the coil supporting unit 29 of the coil mounting portion 20. A pair of the left and right proximity facilitating protruding portions 31, 32 provided on the coil mounting portion 20 of the intricately structured holder 10 is formed as a pair of the left and right substantially rectangular pedestal-shaped proximity facilitating protruding portions 31/32, which are provided in such a manner as to protrude toward the outside of the intricately structured holder main body 11 from the intricately structured holder main body 11 (FIGS. 1 and 2) provided with the substantially flat-plate-shaped coil 40 in a substantially rectangular annular shape, in order to enable a pair of the left and right vertically elongated effective length portions 41/42 of the substantially flat-plate-shaped coil 40 (FIGS. 1, 3, and 4) in a substantially rectangular annular shape to be brought closer to the pole surface portions 81/92 of a pair of the left and right substantially rectangular flat-plate-shaped magnets 80/90 (FIGS. 3 and 4) that faces the substantially flat-plate-shaped coil 40 (FIGS. 1, 3, and 4) in a substantially rectangular annular shape (FIG. 2).

If the holder 10 depicted in FIGS. 1 and 2 is made up, the magnetic field generated by the magnets 80, 90 is efficiently utilized and the sensitivity of the coil 40 to the magnets 80, 90 may be improved. The one substantially rectangular pedestal-shaped proximity facilitating protruding portion 31 is provided in such a manner as to protrude toward the outside of the intricately structured holder main body 11 from the intricately structured holder main body 11 provided with the coil 40, and thus, when the holder main body 11 is provided with the coil 40, the one vertically elongated effective length portion 41 of the substantially flat-plate-shaped coil 40 in a substantially rectangular annular shape that is in contact with the one substantially rectangular pedestal-shaped proximity facilitating protruding portion 31 is pushed out toward the positive pole surface portion 81 of the one substantially rectangular flat-plate-shaped magnet 80. As a result, the one vertically elongated effective length portion 41 of the substantially flat-plate-shaped coil 40 in a substantially rectangular annular shape is brought closer to the positive pole surface portion 81 of the one substantially rectangular flat-plate-shaped magnet 80. The other substantially rectangular pedestal-shaped proximity facilitating protruding portion 32 is provided in such a manner as to protrude from the intricately structured holder main body 11 provided with the coil 40 toward the outside of the intricately structured holder main body 11, and thus, when the holder main body 11 is provided with the coil 40, the other vertically elongated effective length portion 42 of the substantially flat-plate-shaped coil 40 in a substantially rectangular annular shape that is in contact with the other substantially rectangular pedestal-shaped proximity facilitating protruding portion 32 is pushed out toward the negative pole surface portion 92 of the other substantially rectangular flat-plate-shaped magnet 90. As a result, the other vertically elongated effective length portion 42 of the substantially flat-plate-shaped coil 40 in a substantially rectangular annular shape is brought closer to the negative pole surface portion 92 of the other substantially rectangular flat-plate-shaped magnet 90. Therefore, the sensitivity is improved in the substantially flat-plate-shaped coil 40 in a substantially rectangular annular shape provided on the intricately structured holder 10 to a pair of the left and right substantially rectangular flat-plate-shaped magnets 80, 90.

The coil mounting portion 20 of the holder main body 11 making up the holder 10 includes a pair of the upper and lower substantially rectangular flat-plate-shaped wire-wound flange portions 23, 24 that prevent the substantially flat-plate-shaped coil 40 in a substantially rectangular annular shape formed by winding around the intricately structured coil mounting portion 20 from being unwound and detached from the intricately structured coil mounting portion 20, and thus, even if the one vertically elongated effective length portion 41 of the substantially flat-plate-shaped coil 40 in a substantially rectangular annular shape that is in contact with the one substantially rectangular pedestal-shaped proximity facilitating protruding portion 31 is pushed out toward the positive pole surface portion 81 of the one substantially rectangular flat-plate-shaped magnet 80 and the one vertically elongated effective length portion 41 of the substantially flat-plate-shaped coil 40 in a substantially rectangular annular shape is brought closer to the positive pole surface portion 81 of the one substantially rectangular flat-plate-shaped magnet 80, and even if the other vertically elongated effective length portion 42 of the substantially flat-plate-shaped coil 40 in a substantially rectangular annular shape that is in contact with the other substantially rectangular pedestal-shaped proximity facilitating protruding portion 32 is pushed out toward the negative pole surface portion 92 of the other substantially rectangular flat-plate-shaped magnet 90 and the other vertically elongated effective length portion 42 of the substantially flat-plate-shaped coil 40 in a substantially rectangular annular shape is brought closer to the negative pole surface portion 92 of the other substantially rectangular flat-plate-shaped magnet 90, it is avoided that the substantially flat-plate-shaped coil 40 in a substantially rectangular annular shape is unwound, for example, and accidentally detached from the intricately structured coil mounting portion 20 provided with the substantially flat-plate-shaped coil 40 in a substantially rectangular annular shape toward the outside of the intricately structured holder main body 11 including the coil mounting portion 20.

The upper short side portion 43 of the substantially flat-plate-shaped coil 40 in a substantially rectangular annular shape is hooked by the substantially rectangular flat-plate-shaped wire-wound flange portions 23 that is the upper detachment preventing portion 23 making up the coil mounting portion 20, and the lower short side portion 44 of the substantially flat-plate-shaped coil 40 in a substantially rectangular annular shape is hooked by the substantially rectangular flat-plate-shaped wire-wound flange portions 24 that is the lower detachment preventing portion 24 making up the coil mounting portion 20, and thus, the substantially flat-plate-shaped coil 40 in a substantially rectangular annular shape is securely hooked by the intricately structured coil mounting portion 20.

The proximity facilitating protruding portions 31/32 of the coil mounting portion 20 of the intricately structured holder 10 is provided with a plurality of curvature relaxing portions 31*b*, 31*c*/32*b*, 32*c* (FIGS. 1 and 2), which relax a degree of curvature in a pair of the left and right effective length portions 41/42 of the substantially flat-plate-shaped coil 40 (FIG. 1) in a substantially rectangular annular shape, when a pair of the left and right effective length portions 41/42 of the substantially flat-plate-shaped coil 40 (FIG. 1) in a substantially rectangular annular shape is partially curved and deformed so that a pair of the left and right effective length portions 41/42 of the substantially flat-plate-shaped coil 40 in a substantially rectangular annular shape is brought closer to a pair of the left and right substantially rectangular flat-plate-shaped magnets 80/90 that faces the substantially flat-plate-shaped coil 40 in a substantially rectangular annular shape (FIGS. 3 and 4) due to the contact of the substantially flat-plate-shaped coil 40 (FIG. 1) in a substantially rectangular annular shape with a pair of the left and right proximity facilitating protruding portions 31/32 (FIGS. 1 and 2).

Therefore, the substantially flat-plate-shaped coil 40 in a substantially rectangular annular shape is formed without an excessive bending force, for example, is applied to the substantially linear conductor. The proximity facilitating protruding portions 31/32 of the coil mounting portion 20 of the intricately structured holder 10 is provided with a plurality of the curvature relaxing portions 31*b*, 31*c*/32*b*, 32*c* that relax a degree of curvature in a pair of the left and right effective length portions 41/42 of the substantially flat-plate-shaped coil 40 in a substantially rectangular annular shape, and thus, when the substantially flat-plate-shaped coil 40 in a substantially rectangular annular shape is made up by winding the substantially linear conductor around the intricately structured coil mounting portion 20, even if a pair of the left and right effective length portions 41/42 of the substantially flat-plate-shaped coil 40 in a substantially rectangular annular shape is partially curved and deformed to be formed, the substantially flat-plate-shaped coil 40 in a substantially rectangular annular shape is made up without trouble.

The curvature relaxing portions 31*b*, 31*c*/32*b*, 32*c* of the proximity facilitating protruding portions 31/32 provided on the coil mounting portion 20 of the intricately structured holder 10 (FIG. 2) are formed as the substantially trapezoidal inclined surface portions 31*b*, 31*c*/32*b*, 32*c* that relax a degree of curvature in a pair of the left and right vertically elongated effective length portions 41/42 of the substantially flat-plate-shaped coil 40 (FIG. 1) in a substantially rectangular annular shape (FIG. 2).

Therefore, it is avoided that, for example, an excessive bending force is applied to the substantially linear conductor when the substantially flat-plate-shaped coil 40 in a substantially rectangular annular shape is formed around the intricately structured coil mounting portion 20. When the substantially flat-plate-shaped coil 40 in a substantially rectangular annular shape is made up by winding the substantially linear conductor around the intricately structured coil mounting portion 20, the substantially linear conductor making up the substantially flat-plate-shaped coil 40 in a substantially rectangular annular shape is provided around the intricately structured coil mounting portion 20 of the intricately structured holder 10 while being bent and deformed along the substantially trapezoidal inclined surface portions 31*b*, 31*c*/32*b*, 32*c* making up the proximity facilitating protruding portions 31/32.

As depicted in FIGS. 1 and 2, the first holder 10 includes a pair of the front and rear intricately structured coil mounting portions 20, 20 allowing electrically conductive substantially linear conductors to be directly wound therearound. A pair of the front and rear substantially flat-plate-shaped coils 40, 40 (FIGS. 1, 3, and 4) in a substantially rectangular annular shape is made up by directly winding the substantially linear conductors around a pair of the front and rear intricately structured coil mounting portions 20, 20. The left substantially rectangular pedestal-shaped substantially truncated-pyramidal-shaped proximity facilitating protruding portion 31 of the coil mounting portion 20 is provided with a winding facilitating portion 31*d* (FIG. 2) that facilitates the substantially linear conductor being directly wound around the intricately structured coil mounting portion 20, when the substantially flat-plate-shaped coil 40 (FIG. 1) in a substantially rectangular annular shape is made up around the intricately structured coil mounting portion 20 making up the intricately structured holder 10 (FIGS. 1 and 2). The right substantially rectangular pedestal-shaped substantially truncated-pyramidal-shaped proximity facilitating protruding portion 32 of the coil mounting portion 20 is provided with a winding facilitating portion 32*d* (FIG. 2) that facilitates the substantially linear conductor being directly wound around the intricately structured coil mounting portion 20, when the substantially flat-plate-shaped coil 40 (FIG. 1) in a substantially rectangular annular shape is made up around the intricately structured coil mounting portion 20 making up the intricately structured holder 10 (FIGS. 1 and 2).

Therefore, when the substantially flat-plate-shaped coil 40 in a substantially rectangular annular shape is made up by directly winding the substantially linear conductor around the intricately structured coil mounting portion 20 of the intricately structured holder 10, the substantially flat-plate-shaped coil 40 in a substantially rectangular annular shape is easily made up. The left substantially rectangular pedestal-shaped substantially truncated-pyramidal-shaped proximity facilitating protruding portion 31 of the coil mounting portion 20 is provided with the winding facilitating portion 31*d* that facilitates the substantially linear conductor being directly wound around the intricately structured coil mounting portion 20, and the right substantially rectangular pedestal-shaped substantially truncated-pyramidal-shaped proximity facilitating protruding portion 32 of the coil mounting portion 20 is provided with the winding facilitating portion 32*d* that facilitates the substantially linear conductor being directly wound around the intricately structured coil mounting portion 20, and thus, the winding operation of the substantially linear conductor is easily performed when the substantially flat-plate-shaped coil 40 in a substantially rectangular annular shape is made up around the intricately structured coil mounting portion 20. Since the winding operation of the substantially linear conductor is easily performed around the intricately structured coil mounting portion 20 of the intricately structured holder 10, the cost for the conductor winding operation is kept lower to achieve cost reduction in the actuator 5 and the OPU 3, for example.

The winding facilitating portion 31*d* of the left proximity facilitating protruding portion 31 of the coil mounting portion 20 formed in a protruding manner on the holder main body 11 of the intricately structured holder 10 (FIG. 2) is formed as the substantially trapezoidal inclined surface portion 31*d* that facilitates guiding of the substantially linear conductor onto the substantially rectangular planar outermost surface portion 31*a* of the substantially rectangular pedestal-shaped left proximity facilitating protruding portion 31 of the coil mounting portion 20 (FIG. 2), when the coil 40 (FIG. 1) is made up by placing the substantially linear conductor along the substantially rectangular planar outermost surface portion 31*a* of the substantially rectangular pedestal-shaped substantially truncated-pyramidal-shaped proximity facilitating protruding portion 31 for a plurality of times (FIGS. 1 and 2). The winding facilitating portion 32*d* of the right proximity facilitating protruding portion 32 of the coil mounting portion 20 formed in a protruding manner on the holder main body 11 of the intricately structured holder 10 (FIG. 2) is also formed as the substantially trapezoidal inclined surface portion 32*d* that facilitates guiding of the substantially linear conductor onto the substantially rectangular planar outermost surface portion 32*a* of the substantially rectangular pedestal-shaped right proximity facilitating protruding portion 32 of the coil mounting portion 20 (FIG. 2), when the coil 40 (FIG. 1) is made up by placing the substantially linear conductor along the substantially rectangular planar outermost surface portion 32*a* of the substantially rectangular pedestal-shaped substantially truncated-pyramidal-shaped proximity facilitating protruding portion 32 for a plurality of times (FIGS. 1 and 2).

Therefore, the substantially flat-plate-shaped coil 40 in a substantially rectangular annular shape is easily made up formed around the intricately structured coil mounting portion 20 of the intricately structured holder 10. When the coil 40 is made up by placing the substantially linear conductor along the substantially rectangular planar outermost surface portion 31*a* of the substantially rectangular pedestal-shaped substantially truncated-pyramidal-shaped left proximity facilitating protruding portion 31 for a plurality of times, the substantially linear conductor is guided onto the substantially rectangular planar outermost surface portion 31*a* of the substantially rectangular pedestal-shaped proximity facilitating protruding portion 31 while the substantially linear conductor is brought in sliding contact with the substantially trapezoidal inclined surface portion 31*d* of the substantially rectangular pedestal-shaped substantially truncated-pyramidal-shaped proximity facilitating protruding portion 31, and thus, the winding operation of the substantially linear conductor is easily and quickly performed when the substantially flat-plate-shaped coil 40 in a substantially rectangular annular shape is made up around the intricately structured coil mounting portion 20 of the intricately structured holder 10. When the coil 40 is formed by placing the substantially linear conductor along the substantially rectangular planar outermost surface portion 32*a* of the substantially rectangular pedestal-shaped substantially truncated-pyramidal-shaped right proximity facilitating protruding portion 32 for a plurality of times, the substantially linear conductor is guided onto the substantially rectangular planar outermost surface portion 32*a* of the substantially rectangular pedestal-shaped proximity facilitating protruding portion 32 while the substantially linear conductor is brought in sliding contact with the substantially trapezoidal inclined surface portion 32*d* of the substantially rectangular pedestal-shaped substantially truncated-pyramidal-shaped proximity facilitating protruding portion 32, and thus, the winding operation of the substantially linear conductor is easily and quickly performed when the substantially flat-plate-shaped coil 40 in a substantially rectangular annular shape is made up around the intricately structured coil mounting portion 20 of the intricately structured holder 10. Therefore, for example, when the actuator 5 and the OPU 3 are configured, the cost for the winding operation of the substantially linear conductor is kept lower in the intricately structured coil mounting portion 20 of the intricately structured holder 10.

The first holder 10 (FIGS. 1 and 2) includes a pair of wire mounting units 12, 12 to which the suspension wires 50 (FIG. 5) are attached. The metal suspension wires 50 are inserted through wire attaching holes 12*a* of the wire mounting units 12 formed in a protruding manner on the first holder 10 of the holder assembly 100 and are soldered and connected to one end of each of the coils 40, 40, 70, 70, to be attached to the first holder 10 of the holder assembly 100. While the suspension wires 50 are inserted through the wire attaching holes 12*a* of a pair of the left and right wire mounting units 12, 12, an adhesive such as an electron beam curing adhesive is applied to the wire attaching holes 12*a* so that the suspension wires 50 are fixed to the holder assembly 100 by curing of the adhesive such as the electron beam curing adhesive. As the adhesive, the adhesive of the same kind as the adhesive for fixing the OBL 250 to the first holder 10 making up the holder assembly 100 is used, for example. The holder assembly 100 provided with the OBL 250 is elastically supported in a movable manner by a plurality of the metal suspension wires 50. As the suspension wires 50, there are used those obtained by performing a plating process, for example, for electric wires that are small-diameter conductors excellent in elastic support characteristics, or the like.

The metal suspension wires 50 (FIG. 5) are electrically connected and attached to the circuit board 150 provided with circuit conductors. The circuit board 150 is made up such that metal circuit conductors (not depicted) are formed on a board main body made of a synthetic resin and insulating coating (not depicted) is provided thereon, for example. The circuit board is called PWB (printed wired board/printed wiring board), etc., for example.

As depicted in FIGS. 1 and 2, the second holder 60 is the intricately shaped holder 60 provided with a plurality of the substantially rectangular cylindrical coils 70 that are made up by winding the electrically conductive substantially linear conductors around a plurality of intricately structured coil mounting portions 62. The second holder 60 includes a pair of the left and right intricately structured coil mounting portions 62, 62 allowing the electrically conductive substantially linear conductors to be directly wound therearound. A pair of the left and right substantially rectangular cylindrical coils 70, 70 is made up by directly winding the substantially linear conductors around a pair of the left and right intricately structured coil mounting portions 62, 62.

The coils 40, 40 are formed by using a jig or tool (not depicted), for example, to wind small-diameter conductors around the coil mounting portions 20, 20 of the first holder 10. The coils 70, 70 are formed by using a jig or tool (not depicted), for example, to wind small-diameter conductors around the coil mounting portions 62, 62 of the second holder 60. As the conductors, small-diameter enamel-coated electric wires are used, for example. For example, the single-layer winding coils 40, 40, 70, 70 are formed by performing the winding operations of small-diameter linear conductors coated with an enamel material.

Specifically, the electrically conductive substantially linear conductors are wound around a pair of the front and rear coil mounting portions 20, 20 provided on the first holder 10 for several ten to several hundred times, to form on the first holder 10 a pair of the front and rear substantially plate-shaped substantially rectangular annular single-layer hollow first coils 40, 40. The electrically conductive substantially linear conductors are wound around a pair of the left and right coil mounting portions 62, 62 provided on the second holder 60 for several ten to several hundred times, to form, on the second holder 60, a pair of the left and right substantially rectangular cylindrical single-layer hollow second coils 70, 70.

Depending on the design/specification, etc., of the OPU 3, the actuator 5, etc., for example, two-layer hollow coils (40), (70) may be formed. As used herein, parentheses ( ) added to reference numerals are used for convenience of description of those slightly different from the depicted elements.

After the coil winding operations are performed, the first holder 10 including a pair of the front and rear first coils 40, 40 and the second holder 60 including a pair of the left and right second coils 70, 70 are assembled to make up the holder assembly 100 having the two-piece structure. For example, when executing an assembling method of the holder assembly 100 having the holders 10, 60, the actuator 5 and the OPU 3, the holder assembly 100 having the two-piece structure is made up by assembling the first holder 10 and the second holder 60 after the winding operation has been completed of a pair of the front and rear first coils 40, 40 of a pair of the front and rear coil mounting portions 20, 20 of the first holder 10 and the winding operation of a pair of the left and right second coils 70, 70 of a pair of the left and right coil mounting portions 62, 62 of the second holder 60, and thus, the coil winding operations are smoothly and efficiently performed.

A first yoke (not depicted) adjoining to the first magnet 80 (FIGS. 3 and 4) is inserted into a first yoke receiving unit 110 in a substantially rectangular box shape on the left side of the assembled holder assembly 100 without contact with surroundings (FIGS. 1 and 2). A second yoke (not depicted) adjoining to the second magnet 90 (FIGS. 3 and 4) is inserted into a second yoke receiving unit 120 in a substantially rectangular box shape on the right side of the assembled holder assembly 100 without contact with surroundings (FIGS. 1 and 2). The first yoke and the second yoke not depicted are those making up the frame yoke 130, for example.

The actuator 5 (FIGS. 1 to 5) includes at least the substantially rectangular box-shaped holder 10 (FIGS. 1 and 2), a pair of the front and rear substantially flat-plate-shaped coils 40, 40 (FIGS. 1, 3, and 4) in a substantially rectangular annular shape provided on a pair of the front and rear coil mounting portions 20, 20 of the substantially rectangular box-shaped holder 10, and two pairs of the front and rear substantially rectangular flat-plate-shaped magnets 80, 90, 80, 90 (FIGS. 3 and 4) facing a pair of the front and rear substantially flat-plate-shaped coils 40, 40 in a substantially rectangular annular shape.

Specifically, the actuator 5 (FIGS. 1 to 5) includes: the holder assembly 100 including the substantially rectangular box-shaped first holder 10 (FIGS. 1 and 2) and the substantially differently shaped second holder 60; a pair of the front and rear substantially flat-plate-shaped first coils 40, 40 (FIGS. 1, 3, and 4) in a substantially rectangular annular shape provided on a pair of the front and rear coil mounting portions 20, 20 of the substantially rectangular box-shaped first holder 10; a pair of the left and right substantially rectangular cylindrical second coils 70, 70 provided on a pair of the left and right coil mounting portions 62, 62 of the substantially differently shaped second holder 60 (FIGS. 1 and 2); two pairs of the front and rear substantially rectangular flat-plate-shaped first and second magnets 80, 90, 80, 90 (FIGS. 3 and 4) close to a pair of the front and rear substantially flat-plate-shaped first coils 40, 40 (FIGS. 1, 3, and 4) in a substantially rectangular annular shape and close to a pair of the left and right substantially rectangular cylindrical second coils 70, 70 (FIGS. 1 and 2); the frame yoke 130 provided with the first magnets 80 and the second magnets 90 and including the first yoke not depicted and the second yoke not depicted; the suspension wire 50 (FIG. 5) that elastically supports the holder assembly 100 made up by assembling the first holder 10 (FIGS. 1 and 2) and the second holder 60; a damping material (not depicted) in a substantially gelled state, for example, that restrains abnormal vibrations generated in the suspension wire 50, for example; a substantially rectangular box-shaped damping holding member 140 that holds the damping material; and the PWB 150 having the suspension wires 50 attached thereto and attached to the damping holding member 140.

Figure 9:
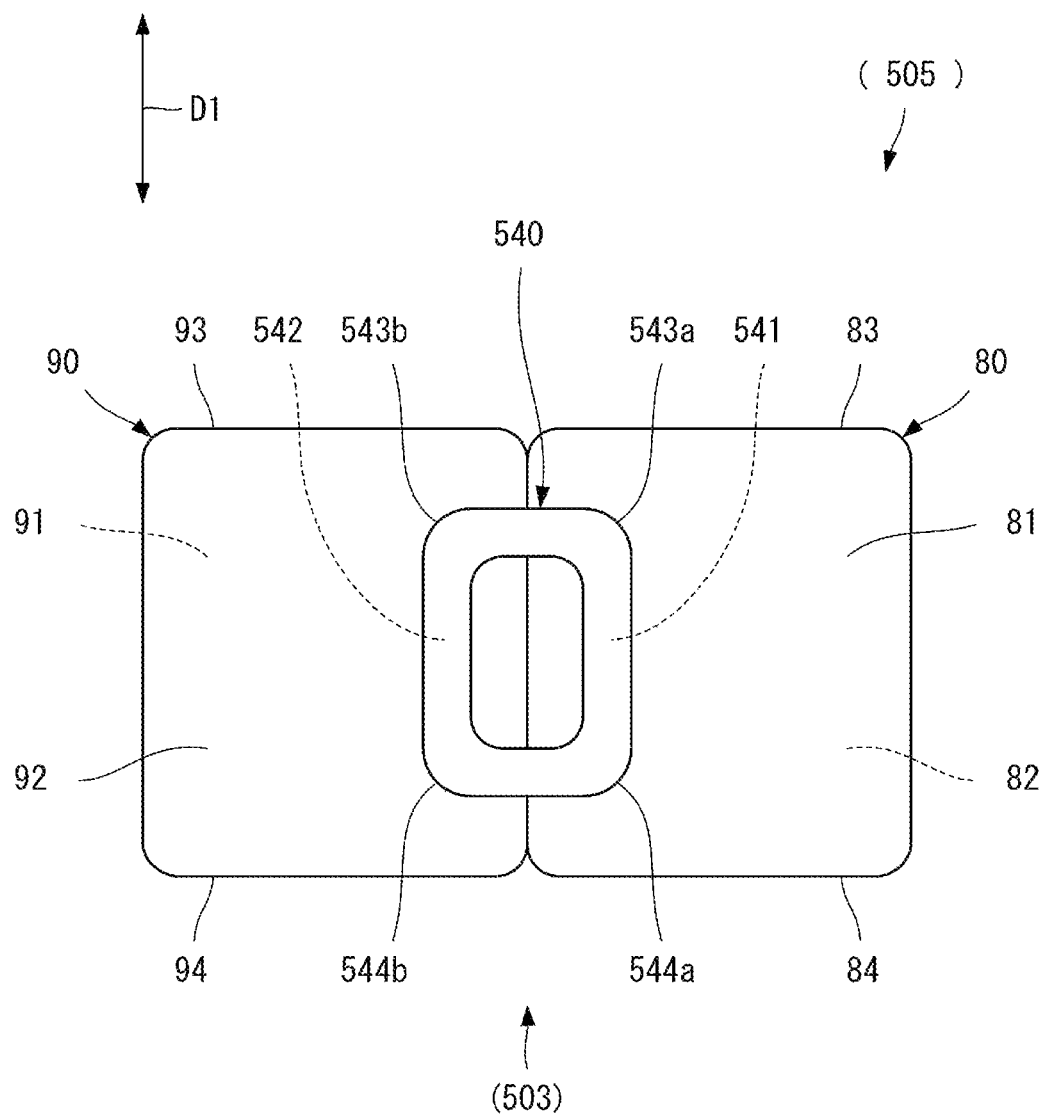
FIG. 9 is an explanatory diagram of a portion of a driving apparatus.
Figure 10:
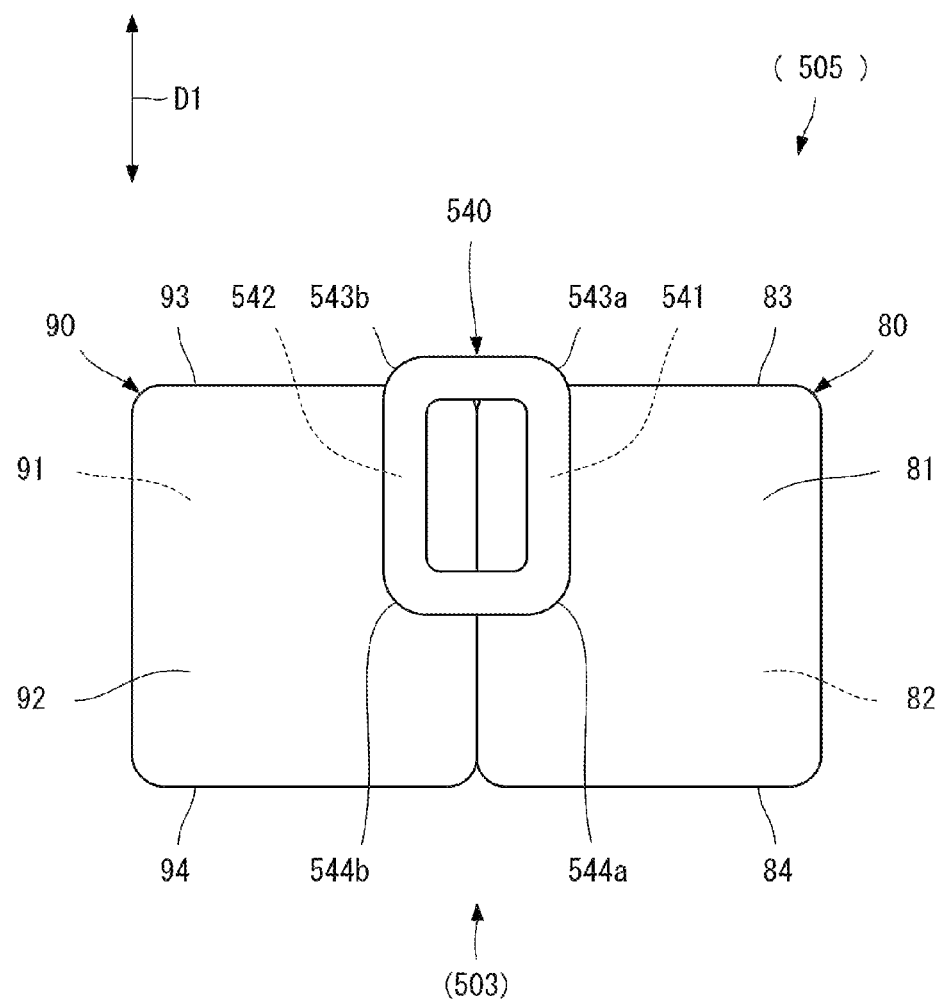
FIG. 10 is also an explanatory diagram of a portion of a driving apparatus.

For example, in the initial state of the actuator 5 (FIG. 9) of the OPU 3 (FIG. 1) or if the OBL 250 is located at a focused point for the signal layer Ma of the optical disc M of the DVD standard (not depicted), for example, when a portion of the actuator 5 is viewed laterally from inside to outside, the coil 40 making up the actuator 5 is in a substantially vertically middle position relative to the magnets 80, 90 facing the coil 40. In this case, the coil 40 making up the actuator 5 is in such a neutral state as to be in a substantially vertically middle position relative to the magnets 80, 90 facing the coil 40.

By assembling the actuator 5 depicted in FIGS. 1 to 5, such an actuator 5 is made up that the magnetic field generated from the magnets 80, 90 is efficiently utilized and the sensitivity of the coil 40 to the magnets 80, 90 is improved. When a pair of the left and right proximity facilitating protruding portions 31, 32 of the intricately structured holder 10 is provided with the substantially flat-plate-shaped coil 40 in a substantially rectangular annular shape, the left effective length portion 41 of the substantially flat-plate-shaped coil 40 in a substantially rectangular annular shape is brought closer to the positive pole surface portion 81 of the one substantially rectangular flat-plate-shaped magnet 80 by the left proximity facilitating protruding portion 31 of the coil mounting portion 20, and the right effective length portion 42 of the substantially flat-plate-shaped coil 40 in a substantially rectangular annular shape is brought closer to the negative pole surface portion 92 of the other substantially rectangular flat-plate-shaped magnet 90 by the right proximity facilitating protruding portion 32 of the coil mounting portion 20, and thus, the sensitivity of the coil 40 to the magnets 80, 90 is improved. Since electricity is passed through the substantially flat-plate-shaped first coil 40 in a substantially rectangular annular shape closely facing to a pair of the left and right substantially rectangular flat-plate-shaped magnets 80, 90, the substantially rectangular box-shaped holder assembly 100, which includes the substantially rectangular box-shaped first holder 10 having at least the substantially flat-plate-shaped first coils 40, 40 in a substantially rectangular annular shape, is efficiently driven substantially along the left-and-right direction D2.

Since electricity is passed through the substantially rectangular cylindrical second coil 70 closely facing to a pair of the left and right substantially rectangular flat-plate-shaped magnets 80, 90, the substantially rectangular box-shaped holder assembly 100, which includes the substantially differently shaped second holder 60 having at least the substantially rectangular cylindrical second coils 70, 70, is efficiently driven substantially along the up-and-down direction D1.

In the case where a whole of the first flat surface portion 41*a* of the substantially flat-plate-shaped coil 40 in a substantially rectangular annular shape is located over a whole of the flat surface portion 81 of the first substantially flat-plate-shaped magnet 80 (FIG. 3) with a predetermined distance in a substantially uniform manner, where the first flat surface portion 41*a* of the substantially flat-plate-shaped coil 40 in a substantially rectangular annular shape is disposed substantially parallel to the flat surface portion 81 of the first substantially flat-plate-shaped magnet 80, where a whole of the second flat surface portion 42*a* of the substantially flat-plate-shaped coil 40 in a substantially rectangular annular shape is located over a whole of the flat surface portion 92 of the second substantially flat-plate-shaped magnet 90 with a predetermined distance in a substantially uniform manner, and where the second flat surface portion 42*a* of the substantially flat-plate-shaped coil 40 in a substantially rectangular annular shape is disposed substantially parallel to the flat surface portion 92 of the second substantially flat-plate-shaped magnet 90; when the movable unit 7 including the coil 40 of the actuator 5 is moved substantially along the up-and-down direction D1, for example (FIG. 4), a substantially curved first end 43*a* on the upper side of the substantially rectangular annular coil 40 may be located above the upper end surface portion 83 of the substantially flat-plate-shaped first magnet 80, and a substantially curved second end 43*b* on the upper side of the substantially rectangular annular coil 40 may be located above the upper end surface portion 93 of the substantially flat-plate-shaped second magnet 90.

Alternatively, a substantially curved third end 44*a* on the lower side of the substantially rectangular annular coil 40 may be located below the lower end surface portion 84 of the substantially flat-plate-shaped first magnet 80 (not depicted), and a substantially curved fourth end 44*b* on the lower side of the substantially rectangular annular coil 40 may be located below the lower end surface portion 94 of the substantially flat-plate-shaped second magnet 90 (not depicted).

As depicted in FIG. 4, for example, when a portion of the actuator 5 is viewed laterally from inside to outside, if the substantially curved first end 43*a* on the upper side of the substantially rectangular annular coil 40 protrudes upward from the upper end surface portion 83 of the substantially flat-plate-shaped first magnet 80 and if the substantially curved second end 43*b* on the upper side of the substantially rectangular annular coil 40 protrudes upward from the upper end surface portion 93 of the substantially flat-plate-shaped second magnet 90, change in sensitivity is increased in the substantially curved ends 43*a*, 43*b* on the upper side of the substantially rectangular annular coil 40.

However, the left effective length portion 41 of the substantially flat-plate-shaped coil 40 in a substantially rectangular annular shape is brought closer to the positive pole surface portion 81 of the one substantially rectangular flat-plate-shaped magnet 80 by the left proximity facilitating protruding portion 31 of the coil mounting portion 20, and the right effective length portion 42 of the substantially flat-plate-shaped coil 40 in a substantially rectangular annular shape is brought closer to the negative pole surface portion 92 of the other substantially rectangular flat-plate-shaped magnet 90 by the right proximity facilitating protruding portion 32 of the coil mounting portion 20, and thus, even if change in sensitivity is increased in the substantially curved ends 43*a*, 43*b* on the upper side of the substantially rectangular annular coil 40, the sensitivity of the entire coil 40 to the magnets 80, 90 is more improved. Therefore, a rate of change of sensitivity in the substantially curved ends 43*a*, 43*b* on the upper side of the substantially rectangular annular coil 40 becomes a rate of change which is almost negligible relative to a rate of change of sensitivity in the entire substantially rectangular annular coil 40.

For example, when a portion of the actuator 5 is viewed laterally from inside to outside, if the substantially curved first end 43*a* on the upper side of the substantially rectangular annular coil 40 protrudes upward from the upper end surface portion 83 of the substantially flat-plate-shaped first magnet 80 and if the substantially curved second end 43*b* on the upper side of the substantially rectangular annular coil 40 protrudes upward from the upper end surface portion 93 of the substantially flat-plate-shaped second magnet 90, thrust is changed in the substantially curved ends 43*a*, 43*b* on the upper side of the substantially rectangular annular coil 40.

However, the left effective length portion 41 of the substantially flat-plate-shaped coil 40 in a substantially rectangular annular shape is brought closer to the positive pole surface portion 81 of the one substantially rectangular flat-plate-shaped magnet 80 by the left proximity facilitating protruding portion 31 of the coil mounting portion 20, and the right effective length portion 42 of the substantially flat-plate-shaped coil 40 in a substantially rectangular annular shape is brought closer to the negative pole surface portion 92 of the other substantially rectangular flat-plate-shaped magnet 90 by the right proximity facilitating protruding portion 32 of the coil mounting portion 20, and thus, even if thrust is changed in the substantially curved ends 43*a*, 43*b* on the upper side of the substantially rectangular annular coil 40, thrust of the coil 40 to the magnets 80, 90 is more improved. Therefore, a rate of change of thrust in the substantially curved ends 43a, 43b on the upper side of the substantially rectangular annular coil 40 becomes a rate of change which is almost negligible relative to a rate of change of thrust in the entire substantially rectangular annular coil 40.

For example, when a portion of the actuator 5 is viewed laterally from inside to outside, if the substantially curved third end 44a on the lower side of the substantially rectangular annular coil 40 protrudes downward from the lower end surface portion 84 of the substantially flat-plate-shaped first magnet 80 (not depicted) and if the substantially curved fourth end 44b on the lower side of the substantially rectangular annular coil 40 protrudes downward from the lower end surface portion 94 of the substantially flat-plate-shaped second magnet 90 (not depicted), change in sensitivity is increased in the substantially curved ends 44a, 44b on the lower side of the substantially rectangular annular coil 40.

However, the left effective length portion 41 of the substantially flat-plate-shaped coil 40 in a substantially rectangular annular shape is brought closer to the positive pole surface portion 81 of the one substantially rectangular flat-plate-shaped magnet 80 by the left proximity facilitating protruding portion 31 of the coil mounting portion 20, and the right effective length portion 42 of the substantially flat-plate-shaped coil 40 in a substantially rectangular annular shape is brought closer to the negative pole surface portion 92 of the other substantially rectangular flat-plate-shaped magnet 90 by the right proximity facilitating protruding portion 32 of the coil mounting portion 20, and thus, even if change in sensitivity is increased in the substantially curved ends 44a, 44b on the lower side of the substantially rectangular annular coil 40, the sensitivity of the entire coil 40 to the magnets 80, 90 is more improved. Therefore, a rate of change of sensitivity in the substantially curved ends 44a, 44b on the lower side of the substantially rectangular annular coil 40 becomes a rate of change which is almost negligible relative to a rate of change of sensitivity in the entire substantially rectangular annular coil 40.

For example, when a portion of the actuator 505 is viewed laterally from inside to outside, if the substantially curved third end 44a on the lower side of the substantially rectangular annular coil 40 protrudes downward from the lower end surface portion 84 of the substantially flat-plate-shaped first magnet 80 (not depicted) and if the substantially curved fourth end 44b on the lower side of the substantially rectangular annular coil 40 protrudes downward from the lower end surface portion 94 of the substantially flat-plate-shaped second magnet 90 (not depicted), thrust is changed in the substantially curved ends 44a, 44b on the lower side of the substantially rectangular annular coil 40.

However, the left effective length portion 41 of the substantially flat-plate-shaped coil 40 in a substantially rectangular annular shape is brought closer to the positive pole surface portion 81 of the one substantially rectangular flat-plate-shaped magnet 80 by the left proximity facilitating protruding portion 31 of the coil mounting portion 20, and the right effective length portion 42 of the substantially flat-plate-shaped coil 40 in a substantially rectangular annular shape is brought closer to the negative pole surface portion 92 of the other substantially rectangular flat-plate-shaped magnet 90 by the right proximity facilitating protruding portion 32 of the coil mounting portion 20, and thus, even if thrust is changed in the substantially curved ends 44a, 44b on the lower side of the substantially rectangular annular coil 40, thrust of the coil 40 to the magnets 80, 90 is more improved. Therefore, a rate of change of thrust in the substantially curved ends 44a, 44b on the lower side of the substantially rectangular annular coil 40 becomes a rate of change which is almost negligible relative to a rate of change of thrust in the entire substantially rectangular annular coil 40.

As above, it is avoided that the thrust, etc., of the coil 40 to the magnets 80, 90 are considerably changed.

For example, when a portion of the actuator 5 is viewed laterally from inside to outside, even if the substantially curved first end 43a on the upper side of the substantially rectangular annular coil 40 protrudes upward from the upper end surface portion 83 of the substantially flat-plate-shaped first magnet 80 and even if the substantially curved second end 43b on the upper side of the substantially rectangular annular coil 40 protrudes upward from the upper end surface portion 93 of the substantially flat-plate-shaped second magnet 90, it is substantially avoided that a "deviation" occurs at the force application point that is the center of the force generated in the whole of the coil 40, for example, and such a problem is substantially resolved that the vibration mode, etc., of the actuator 5 are affected, for example.

Alternatively, for example, when a portion of the actuator 505 is viewed laterally from inside to outside, even if the substantially curved third end 44a on the lower side of the substantially rectangular annular coil 40 protrudes downward from the lower end surface portion 84 of the substantially flat-plate-shaped first magnet 80 (not depicted) and even if the substantially curved fourth end 44b on the lower side of the substantially rectangular annular coil 40 protrudes downward from the lower end surface portion 94 of the substantially flat-plate-shaped second magnet 90, it is substantially avoided that a "deviation" occurs at the force application point that is the center of the force generated in the whole of the coil 40, for example, and such a problem is substantially resolved that the vibration mode, etc., of the actuator 5, are effected for example.

Figure 5:
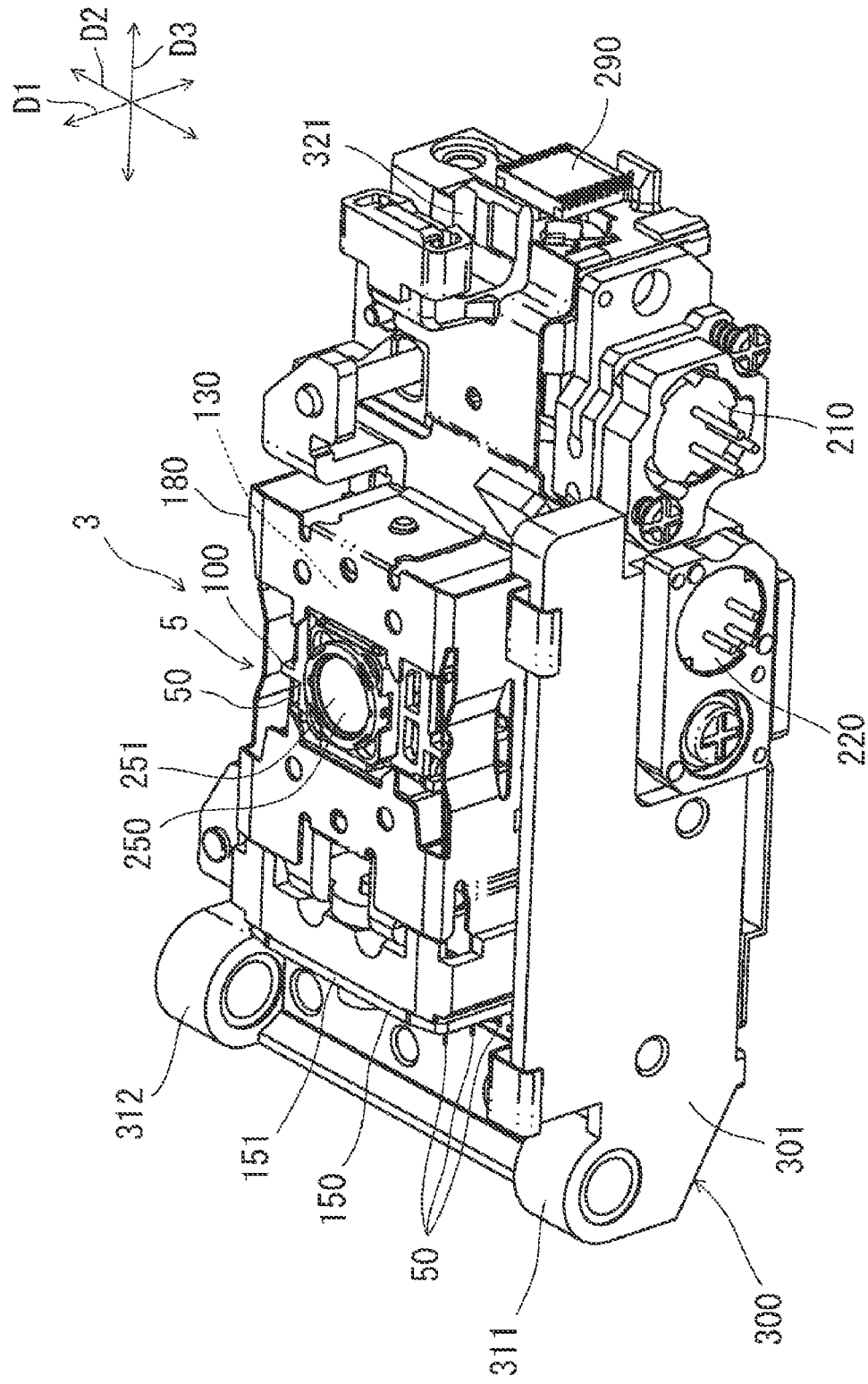
FIG. 5 is a perspective view of a driving apparatus and a pickup apparatus according to an embodiment of the present invention.

The OPU 3 depicted in FIG. 5 includes light-emitting elements 210, 220 (FIG. 5), so-called laser diodes (LD) that apply laser beams to the optical disc M (FIG. 6). The OPU 3 includes a drive circuit unit, so-called laser driver (LDD: LD driver) (not depicted) that passes electricity through the LD 210, 220 to allow the LD 210, 220 to emit light. The OPU 3 includes a flexible board (not depicted) such as a flexible printed circuit (not depicted) that electrically connects electric parts such as the LD 210, 220 and electric parts such as the LDD. The flexible printed circuit is abbreviated as "FPC". The FPC is configured such that a plurality of circuit conductors are printed on an insulating sheet made of a heat-resistant synthetic resin such as a polyimide resin, which is excellent in heat resistance when soldering, etc., are performed, a metal foil, for example, such as a copper foil is placed along the insulating sheet, and a transparent or semi-transparent protective layer is provided thereon (all not depicted). The polyimide is abbreviated as PI, for example.

For example, electricity is passed from the LDD not depicted to the first LD 210 through the FPC, so that the first LD 210 outputs a laser beam. For example, the first LD 210 emits a laser beam of 0.2 to 500 mW (milliwatt) for "CD" which is capable of emission of an infrared laser beam having a wavelength of about 765 to 830 nm (nanometer) and the reference wavelength of about 780 nm. For example, electricity is passed from the LDD not depicted to the second LD 220 through the FPC, so that the second LD 220 outputs a laser beam. For example, the second LD 220 emits a laser beam of 0.2 to 500 mW for "DVD" which is capable of emission of a red laser beam having a wavelength of about 630 to 685 nm and the reference wavelength of substantially 635 nm or 650 nm.

Depending on the design/specification, etc., of the optical disc apparatus 1, the OPU 3, etc., for example, the LD 210/220 emits a laser beam of 0.2 to 500 mW for "HD DVD" and/or "Blu-ray Disc" which is capable of emission of a blue-violet laser beam having a wavelength of about 350 to 450 nm and the reference wavelength of substantially 405 nm. In such a case, the LD 210/220 is configured as the special LD 210/220 capable of emitting laser beams having a plurality of types of wavelength, for example. Various LDs may be used as the LD 210/220.

The LD 210/220 emits a laser beam having an output value of 0.2 mW or more and 500 mW or less, specifically, 0.5 mW or more and 400 mW or less, for example. For example, in the case of a laser beam having an output value less than 0.2 mw, a light amount of the laser beam is insufficient, which reaches the light-emitting element 290 after having been applied to the optical disc M and reflected therefrom. When the data, etc., of the optical disc M are reproduced, a laser beam having an output value of a several mW to several tens of mW is sufficient such as 0.2 mW or more, preferably, about 0.5 mW or more and 20 mW or less, for example. When the data, etc., are written into the optical disc M, a laser beam having an output value of several tens to several hundreds of mW is required. For example, when the data, etc., are written into the optical disc M at a high speed, a pulse laser beam having a high output value such as 400 mW or 500 mW may be required.

The OPU 3 includes a light-receiving element 290, so-called light detector or photodetector (PD) or PDIC (photo diode IC) 290 that receives the laser beam reflected by the signal surface portion Ma of the optical disc M. The PDIC 290 includes at least three light-receiving units, which are a main light-receiving unit (not depicted) having a substantially rectangular shape in a plan view corresponding to a main beam (zeroth-order light) having passed through a diffraction grating (not depicted) divided into a plurality of parts such as a quadruple type, for example, and a pair of sub-light-receiving units (not depicted) each having a substantially rectangular shape in a plan view corresponding to a pair of sub-beams (±first-order diffracted light beams) diffracted and divided by passing through the diffraction grating. The main light-receiving unit having a substantially rectangular shape in a plan view is substantially evenly divided into four parts and includes four segments each having a substantially rectangular shape in a plan view. The sub-light-receiving unit having a substantially rectangular shape in a plan view is substantially evenly divided into four parts and includes four segments each having a substantially rectangular shape in a plan view. As such, the OPU 3 is provided with the PDIC 290 including the multi-divided type light-receiving units with a plurality of segments each having a substantially rectangular shape in a plan view.

The PDIC 290 is a unit for receiving a laser beam reflected from the signal surface portion Ma of the optical disc M and converting such a signal into an electric signal to detect the data, information, and signal recorded on the signal surface portion Ma of the optical disc M. The PDIC 290 is a unit for receiving a laser beam reflected from the signal surface portion Ma of the optical disc M and converting such a signal into an electric signal to operate a servo mechanism (not depicted) of the holder assembly 100 including the lens holder 10 with the OBL 250 making up the OPU 3. When the OPU 3 reads the data/information/signal recorded in the optical disc M or writes the data/information/signal recorded in the optical disc M, the laser beams are applied to the light-receiving units of the PDIC 290 to detect a main information signal of the optical disc M and a focus error signal and a tracking signal for the optical disc M.

A focusing detecting method for a converged light spot on the optical disc M in the OPU 3 includes a detecting method based on a differential astigmatic method, for example. The differential astigmatic method is, for example, a method of detecting a displacement of a converged light spot by detecting a point image distortion imaged by an optical system having astigmatism. The focusing detecting method for a converged light spot in the OPU 3 is a detecting method based on a differential astigmatic method, for example. As the focusing detecting method another detecting method such as a knife-edge method may be used.

A tracking detecting method for a converged light spot on the optical disc M in the OPU 3 includes a detecting method based on a differential push-pull (DPP) method, for example. The differential push-pull method is a method of detecting a displacement of a converged light spot using a main beam for reading/writing data and two sub-beams for detecting a correction signal for a positional deviation, for example. The tracking detecting method for a converged light spot in the OPU 3 is considered as a detecting method based on a differential push-pull method, for example. As the tracking method, another detecting method such as a phase difference method may be used.

The OPU 3 includes a housing 300 provided with various optical system parts and electric system parts, etc. The housing means a case, a box-shaped object, or an object similar to a box for housing things such as apparatuses and parts. The housing 300 is made of a metal material excellent in heat radiation characteristics or a resin material excellent in sliding characteristics, for example.

The optical system parts provided in the housing 300 are a laser diode, half-wavelength plate (½λ plate), wide-band quarter-wavelength plate (¼λ plate) with aperture restriction, a liquid crystal correction element, a diffractive optical element (DOE), a diffraction grating (inline grating), a divergent lens, a prism, a polarizing beam splitter, a dichroic filter, a collimating lens, a beam expander lens, a half mirror, a reflection mirror, a total-reflection mirror, an objective lens, a front monitor diode, a sensor lens, an anamorphic lens, an intermediate lens, and a photodetector, for example. The OPU 3 includes the above optical system parts.

The electric system parts provided in the housing 300 are a printed board, a storage device (ROM: read-only memory), a suspension wire, a coil, an actuator, a flexible printed circuit, a laser driver, a laser diode, a liquid crystal correction element, a beam expander unit, a front monitor diode, and a photodetector, for example. The OPU 3 includes the above electric system parts.

Various parts (not depicted) such as various optical system parts and electric system parts making up the OPU 3 are provided in the housing 300 made of metal or synthetic resin. The housing 300 is formed including a housing main body 301 provided with various parts such as various optical system parts and electric system parts, a pair of main-shaft bearings 311, 312 provided in such a manner as to protrude from the housing main body 301 and assembled in a movable manner with a first shaft member 410, and a sub-shaft bearing 321 provided in such a manner as to protrude from the housing main body 301 toward the opposite side of the main-shaft bearings 311, 312 and assembled in a movable manner with a second shaft member 420. The main-shaft bearings 311, 312 and the sub-shaft bearing 321 are integrally formed with the housing main body 301. The main-shaft bearings 311, 312, the sub-shaft bearing 321, and the housing main body 301 are made of the same metal material or the same synthetic resin material, for example, to be formed as a single unit.

When the OPU 3 moves substantially along the longitudinal direction D2 of the substantially round-bar shaft members 410 and 420, the substantially round-hole first bearing 311 comes in sliding contact with the substantially round-bar first shaft member 410. When the OPU 3 moves substantially along the longitudinal direction D2 of the substantially round-bar shaft members 410 and 420, the substantially round-hole second bearing 312 comes in sliding contact with the substantially round-bar first shaft member 410. When the OPU 3 moves substantially along the longitudinal direction D2 of the substantially round-bar shaft members 410 and 420, the third bearing 321 having such a sliding bearing structure as in a shape of substantially U on its side comes in sliding contact with the substantially round-bar second shaft member 420.

The shaft members 410 and 420 are formed, for example, as the slide shafts 410 and 420 capable of coming in sliding contact with the bearings 311, 312, and 321 of the housing 300 of the OPU 3. The bearings 311, 312, and 321 are formed, for example, as sliding units 311, 312, and 321 capable of coming in sliding contact with the slide shafts 410 and 420.

The OPU 3 is supported in a movable manner with a stable substantially three-point structure on a pair of the slide shafts 410, 420 by the first sliding unit 311, the second sliding unit 312, and the third sliding unit 321 of the housing 300. Since the OPU 3 is supported in a movable manner on a pair of the slide shafts 410, 420 at three main points of the first sliding unit 311, the second sliding unit 312, and the third sliding unit 321 of the housing 300, friction is reduced more than that in the case of an OPU of a four-point supporting structure (not depicted), for example.

Since the third sliding unit 321 is made up as a unit making up such an opened sliding bearing structure as in a shape of substantially U on its side, the assembling operation of the OPU 3 is easily performed for the slide shaft 420, which is defined as a sub-shaft, for example. Since the third sliding unit 321 is made up as a unit making up such an opened sliding bearing structure as in a shape of substantially U on its side, a small error in a degree of parallelism, etc., of the slide shaft 420 defined as the sub-shaft relative to the first slide shaft 410 defined as the main shaft, for example, is absorbed by the third sliding unit 321 with such an opened sliding bearing structure as in a shape of substantially U on its side.

The OPU 3 depicted in FIGS. 1 to 5 includes at least the above actuator 5. Therefore, such OPU 3 is configured that the magnetic field generated from the magnets 80, 90, 80, 90 (FIGS. 3 and 4) is efficiently utilized and the sensitivity of the coils 40, 40 to the magnets 80, 90, 80, 90 is improved.

Specifically, the OPU 3 (FIGS. 1 and 5) includes at least: the above substantially rectangular box-shaped lens holder 10 (FIGS. 1 and 2); the OBL 250 that is mounted on the substantially circular-hole-shaped lens mounting unit 15 of the substantially rectangular box-shaped lens holder 10, has a substantially convex curved surface portion 251 (FIG. 5), and focuses a laser beam on the signal layer Ma of the optical disc M (FIG. 6); a pair of the front and rear substantially flat-plate-shaped tracking coils 40, 40 (FIGS. 1, 3, and 4) in a substantially rectangular annular shape provided on a pair of the front and rear coil mounting portions 20, 20 of the substantially rectangular box-shaped lens holder 10 (FIGS. 1 and 2); and two pairs of the front and rear substantially rectangular flat-plate-shaped magnets 80, 90, 80, 90 (FIGS. 3 and 4) facing a pair of the front and rear substantially flat-plate-shaped tracking coils 40, 40 in a substantially rectangular annular shape.

More specifically, the OPU 3 (FIGS. 1 and 5) includes: the lens holder assembly 100 including the substantially rectangular box-shaped first lens holder 10 (FIGS. 1 and 2) and the substantially differently shaped second lens holder 60; the OBL 250 that is mounted on the substantially circular-hole-shaped lens mounting unit 15 of the substantially rectangular box-shaped lens holder 10, has the substantially convex curved surface portion 251 (FIG. 5), and focuses a laser beam on the signal layer Ma of the optical disc M (FIG. 6); a pair of the front and rear substantially flat-plate-shaped tracking coils 40, 40 (FIGS. 1, 3, and 4) in a substantially rectangular annular shape provided on a pair of the front and rear coil mounting portions 20, 20 of the substantially rectangular box-shaped lens holder 10 (FIGS. 1 and 2); a pair of the left and right substantially rectangular cylindrical focusing coils 70, 70 provided on a pair of the left and right coil mounting portions 62, 62 of the substantially differently shaped lens holder 60 (FIGS. 1 and 2); two pairs of the front and rear substantially rectangular flat-plate-shaped first and second magnets 80, 90, 80, 90 (FIGS. 3 and 4) closely facing to a pair of the front and rear substantially flat-plate-shaped tracking coils 40, 40 in a substantially rectangular annular shape and closely facing to a pair of the left and right substantially rectangular cylindrical focusing coils 70, 70; the frame yoke 130 provided with the first magnets 80 and the second magnets 90 and including the first yoke not depicted and the second yoke not depicted; the suspension wire 50 (FIG. 5) that elastically supports the lens holder assembly 100 made up by assembling the first lens holder 10 (FIGS. 1 and 2) and the second lens holder 60; the damping material (not depicted) in a substantially gelled state, for example, that restrains abnormal vibrations generated in the suspension wire 50, for example; the substantially rectangular box-shaped damping holding member 140 that holds the damping material; and the PWB 150 having the suspension wires 50 attached thereto and attached to the damping holding member 140.

Since the OPU 3 as depicted in FIGS. 1 and 5 is assembled, such OPU 3 is configured that the magnetic field generated from the magnets 80, 90 is efficiently utilized and the sensitivity of the tracking coil 40 to the magnets 80, 90 is improved. When a pair of the left and right proximity facilitating protruding portions 31, 32 of the intricately structured lens holder 10 is provided with the substantially flat-plate-shaped tracking coil 40 in a substantially rectangular annular shape, the one effective length portion 41 of the substantially flat-plate-shaped tracking coil 40 in a substantially rectangular annular shape is brought closer to the positive pole surface portion 81 of the one substantially rectangular flat-plate-shaped magnet 80 by the one proximity facilitating protruding portion 31 of the coil mounting portion 20, and the other effective length portion 42 of the substantially flat-plate-shaped coil 40 in a substantially rectangular annular shape is brought closer to the negative pole surface portion 92 of the other substantially rectangular flat-plate-shaped magnet 90 by the other proximity facilitating protruding portion 32 of the coil mounting portion 20, and thus, the sensitivity of the tracking coil 40 to the magnets 80, 90 is improved. Since electricity is passed through the substantially flat-plate-shaped tracking coil 40 in a substantially rectangular annular shape closely facing to a pair of the left and right substantially rectangular flat-plate-shaped magnets 80, 90, the substantially box-shaped holder assembly 100, which includes the substantially rectangular box-shaped first holder 10 having at least the OBL 250 with the substantially convex curved surface portion 251 and the substantially flat-plate-shaped tracking coils 40, 40 in a substantially rectangular annular shape, is efficiently driven substantially along the disc radial direction D2.

Since electricity is passed through the substantially rectangular cylindrical focusing coil 70 closely facing to a pair of the left and right substantially rectangular flat-plate-shaped magnets 80, 90, the substantially rectangular box-shaped holder assembly 100, which includes the substantially differently shaped second holder 60 having at least the substantially rectangular cylindrical focusing coils 70, 70, is driven substantially along the focus direction D1.

The OPU 3 (FIGS. 5 and 6) includes the OBL 250 that condenses a laser beam to apply/form a converged light spot on the signal layer Ma of the optical disc M. The OBL 250 is formed as the convex lens 250 provided with the substantially convex curved surface portion 251 (FIG. 5).

For example, since the OBL 250 is made of a synthetic resin material, the weight reduction of the OBL 250 is achieved. The OBL 250 made of a synthetic resin in a substantially convex lens shape is efficiently mass produced by an injection molding method. Since the mass production of the OBL 250 is enabled, the price reduction of the OBL 250 is achieved.

For example, if a curved convex lens (not depicted) is made by using glass as a material, it is concerned that the weight reduction of the convex lens is difficult. However, when the OBL 250 is produced by using a transparent or semi-transparent synthetic resin material based on the injection molding method that is excellent in mass productivity, the OBL 250 is easily produced/processed to achieve the price reduction of the OBL 250 as well as the lightweight OBL 250 is made.

Since the OBL 250 is made by using a synthetic resin material based on the injection molding method, the actuator 5 and/or the OPU 3 are reduced in weight and the actuator 5 and/or the OPU 3 that may be reduce in price are configured, for example. Since the actuator and/or the OPU 3 including the holder assembly 100 having the synthetic resin OBL 250 is configured after the synthetic resin OBL 250 is made based on the injection molding method, it becomes possible to provide the actuator 5 and/or the OPU 3 that is reduced in weight and cost.

For example, the OBL 250 is made of an injection-moldable transparent or semi-transparent thermoplastic heat-resistant synthetic resin material. Specifically, the OBL 250 is made of a composition using the highly-transparent acrylic/methacrylic resin excellent in weather resistance, mirror surface smoothness, accuracy, etc., as a base material, for example. The official name of the methacrylic resin is polymethyl methacrylate and polymethyl methacrylate is abbreviated as PMMA, for example. The methacrylic resin is also referred to as acrylic resin. The OBL 250 is made of a composition using the polycarbonate resin as a base material, for example, which is excellent in workability and achieves price reduction. Polycarbonate is abbreviated as PC, for example.

The OBL 250 is made using a composition using the PMMA resin as a base material, for example. The composition using PMMA as a base material includes Acrypet (registered trademark) of Mitsubishi Rayon Co., Ltd., for example. Specifically, PMMA includes Acrypet VH001, V001 of Mitsubishi Rayon Co., Ltd., for example. The specific gravity of Acrypet VH001, V001 of Mitsubishi Rayon Co., Ltd., is substantially 1.19, for example. The specific gravity of the composition using a synthetic resin material as a base material may be obtained by a test method based on "ASTM D792", "ISO1183", and "JIS K 7112", for example. The full light transmittance of Acrypet VH001, Mitsubishi Rayon Co., Ltd., is substantially 92.5% by the test method based on "JIS K 7361", for example. The full light transmittance of Acrypet V001, Mitsubishi Rayon Co., Ltd., is substantially 93% by the test method based on "JIS K 7361", for example.

The OBL 250 is made of a composition using PC as a base material, for example. The composition using PC as a base material includes Panlite (registered trademark) of Teijin Limited, for example. Specifically, PC includes Panlite AD-5503 of Teijin Limited, for example. The specific gravity of Panlite AD-5503, Teijin Limited, is substantially 1.2. For example, the light transmittance of Panlite AD-5503, Teijin Limited is substantially 89% by the test method based on "ASTM D 1003" (thickness of 3 mm).

If the OBL 250 is made using an injection-moldable transparent or semi-transparent thermoplastic heat-resistant synthetic resin material, the response characteristics of the actuator 5 and/or the OPU 3 are improved. The resin material has a specific gravity smaller than that of a metal material, for example, and is considered as a material suitable for achieving weight reduction. While the specific gravity of glass is substantially 2.2 to 2.8 and the specific gravity of lead glass is substantially 3.4 to 4.28 the specific gravity of PMMA is substantially 1.16 to 1.2, for example. The specific gravity of PC is substantially 1.2, and the specific gravity of filler-containing PC is substantially 1.4 to 1.43, for example. If the OBL 250 is made of an injection-moldable transparent or semi-transparent thermoplastic heat-resistant synthetic resin material, the OBL 250 is reduced in weight. When the OBL 250 is made of a synthetic resin material, the holder assembly 100 including the OBL 250 is reduced in weight, and as a result, the holder assembly 100 may be moved easily. Since the holder assembly 100 is reduced in weight and may be moved easily, the response characteristics of the actuator 5 and/or the OPU 3 including the holder assembly 100 are improved.

The light transmittance or transparency of the transparent synthetic resin material forming the OBL 250 is substantially 80% or more and 100% or less, preferably, substantially 85% or more and 100% or less, and more preferably, substantially 88% or more and 100% or less, for example. For example, if the light transmittance or transparency of the transparent synthetic resin material forming the OBL 250 is set at a lower value less than substantially 80%, this is not preferable since light passing through the OBL 250 is reduced in efficiency. For example, the light transmittance or transparency of the transparent synthetic resin material forming the OBL 250 is set at a higher value, preferably substantially 85% or more, and more preferably 88% or more, it is more easily avoided that light passing through the OBL 250 is reduced in efficiency. It is preferable that the OBL 250 is made of a composition including a transparent synthetic resin material with higher light transmittance or transparency. For example, it is ideal that the light transmittance or transparency of the transparent synthetic resin material forming the OBL 250 is a value of substantially 100% or a value close to substantially 100%.

Depending on the design/specification, etc., of the lens driving apparatus 1 and the design/specification, etc., of the optical pickup apparatus including the lens driving apparatus 1, the OBL 250 may be made of a transparent or semi-transparent glass material with a light transmittance or transparency of substantially 80% or more and 100% or less, for example, instead of the transparent or semi-transparent synthetic resin material.

The OPU 3 includes the lens holders 10, 60 making up the lens holder assembly 100 (FIG. 2). The lens holders 10, 60 are formed using a thermoplastic aromatic-ring-containing heat-resistant synthetic resin material excellent in moldability based on the injection molding method excellent in mass productivity. If the lens holders 10, 60 are formed based on the injection molding method, the lens holders 10, 60 may be efficiently mass produced even when the lens holders 10, 60 are shaped intricately.

Specifically, the injection-moldable thermoplastic aromatic-ring-containing heat-resistant synthetic resin material is used to form the first lens holder 10 in an integral manner including the holder main body 11, a pair of the intricately shaped coil mounting portions 20, 20 (FIG. 2) made up by winding therearound the substantially linear conductors to form the substantially flat-plate-shaped driving coils 40 (FIG. 1) in a substantially rectangular annular shape, and two pairs of the proximity facilitating portions 31, 32 formed in a protruding manner on the intricately shaped coil mounting portions 20 of the holder main body 11. The injection-moldable thermoplastic aromatic-ring-containing heat-resistant synthetic resin material is used to form the second lens holder 60 in an integral manner including the holder main body 61 and a pair of the substantially rectangular framed coil mounting portions 62, 62 made up by winding therearound the substantially linear conductors to form the substantially rectangular cylindrical driving coils 70.

Specifically, the lens holders 10, 60 are made of a composition using the liquid crystal polymer (LCP) as a base material, for example, which is excellent in thin-wall/accurate formability, excellent in heat resistance when soldering, etc., are performed, and excellent in injection moldability, and may achieve more weight reduction than an iron material. The liquid crystal polymer includes a wholly aromatic liquid crystal resin excellent in heat-resistance, for example.

Since the first lens holder 10 is made of LCP based on the injection molding method, for example, the proximity facilitating portions 31, 32, etc., of the first lens holder 10 are accurately formed. Since the second lens holder 60 is made of LCP based on the injection molding method, for example, the second lens holder 60 is accurately formed.

The composition using type-I LCP excellent in heat-resistance as a base material includes Sumikasuper (registered trademark) of Sumitomo Chemical Co., Ltd., for example. Sumikasuper (registered trademark) products include E5008L and E6008, for example. The specific gravity of "Sumikasuper E5008L", Sumitomo Chemical Co., Ltd., is substantially 1.69, for example. The specific gravity of "Sumikasuper E6008", Sumitomo Chemical Co., Ltd., is substantially 1.7, for example.

The composition using type-I LCP excellent in heat-resistance as a base material includes Xydar (registered trademark) of Nippon Oil Corporation, for example. Xydar (registered trademark) products include 300-series, 400-series, and RC series, and FC series, for example. Specifically, Xydar (registered trademark) products include Grade M-350, Grade M-450, Grade FC-110, and Grade FC-120, for example. The specific gravity of Xydar "Grade M-350" and "Grade M-450", Nippon Oil Corporation is substantially 1.84, for example. The specific gravity of Xydar "Grade FC-110", Nippon Oil Corporation is substantially 1.7, for example.

The composition using type-II LCP as a base material includes Vectra (registered trademark) of Polyplastics Co., Ltd., for example. Vectra (registered trademark) products include Grade A410 and S471, for example. The specific gravity of Vectra "Grade A410, Polyplastics Co., Ltd., is substantially 1.84, for example. The specific gravity of Vectra "Grade S471" available from Polyplastics Co., Ltd., is substantially 1.77, for example.

Type-I and type-II LCPs are wholly aromatic liquid crystal polyester, for example. LCPs of type I, etc., are excellent in thin-wall formability and excellent in heat resistance when soldering, etc., are performed, for example, and thus, they are considered as materials suitable for forming the lens holders 10, 60, etc., for example.

If the first lens holder 10 and the second lens holder 60 are made of the injection-moldable thermoplastic aromatic-ring-containing heat-resistant synthetic resin material, the response characteristics are improved in the lens holder assembly 100 including pairs of the driving coils 40, 40, 70, 70 made up of the substantially linear conductors.

The resin material has a specific gravity smaller than that of a metal material, for example, and is considered as a material suitable for achieving weight reduction. For example, while the specific gravity of iron is substantially 7.85 to 7.87, the specific gravity of LCP is substantially 1.27 to 1.4 and the specific gravity of filler-containing LPC is substantially 1.55 to 1.96. If the lens holders 10, 60 are made of the injection-moldable thermoplastic aromatic-ring-containing heat-resistant synthetic resin material, the holder assembly 100 including the lens holders 10, 60 is reduced in weight.

The lens holders 10, 60 and the OBL 250 have a specific gravity of substantially 1 or more and 2 or less, preferably, a specific gravity of substantially 1.1 or more and 1.9 or less, and specifically, a specific gravity of substantially 1.15 or more and 1.85 or less, for example, and are made of a composition including the injection-moldable thermoplastic synthetic resin material. If the lens holders 10, 60 and the OBL 250 are made of a composition including the injection-moldable thermoplastic synthetic resin material having a specific gravity of substantially 2 or less, preferably 1.9 or less, and more preferably a specific gravity of substantially 1.85 or less, the lens holders 10, 60 and the OBL 250 are reduced in weight. Since the lens holders 10, 60 and the OBL 250 are reduced in weight, the lens holders 10, 60, the OBL 250, and the OPU 3 including the lens holders 10, 60, and the OBL 250 are configured with the response characteristics improved.

Since the lens holders 10, 60 and the OBL 250 are made of a synthetic resin material, the lens holder assembly 100 including the lens holders 10, 60 and the OBL 250 are reduced in weight, and as a result, the lens holder assembly 100 may be moved easily. Since the lens holder assembly 100 including the lens holders 10, 60 and the OBL 250 are reduced in weight and may be moved easily, the response characteristics of the lens holder assembly 100 and the OPU 3 including the lens holder assembly 100 are improved. For example, the lower limit of the specific gravity of the synthetic resin material having the heat resistance, with which the OPU 3 may be used without trouble, is considered to be substantially 1, specifically the order of 1.1, more specifically 1.15, for example. In order to keep the price lower of the lens holder assembly 100 including the lens holders 10 and 60, the lens holders 10 and 60 are made of the same composition material.

The OPU 3 includes the coils 40, 40 (FIGS. 1, 3, and 4), 70, 70 (FIGS. 1 and 2) for driving the lens holder assembly 100 provided with the OBL 250. The substantially linear conductors making up the coils 40, 40 (FIGS. 1, 3, and 4), 70, 70 (FIGS. 1 and 2) are made of a material including light metal such as an aluminum material or an aluminum alloy material, for example. The substantially linear conductors including light metal such as an aluminum material or an aluminum alloy material include enameled copper-clad aluminum wires of Totoku Electric Co., Ltd., for example.

The coils 40, 70 are made up of the substantially linear conductors with an insulating coating material. Specifically, copper-clad aluminum wires (CCAW), which facilitates weight reduction, are used, and self-bonding enamel CCAW, which is coated with an insulating material such as an enamel material, is used to make up the coils 40, 70. The self-bonding enamel CCAW includes an aluminum or aluminum alloy material making up a conductive wire main body, a copper material making up an external layer of the conducting wire main body, and an insulating material and/or a self-bonding material such as an enamel material making up a circumferential portion of the copper material (all not depicted). A thin film formed by an insulating material is made of a polyurethane resin, a class B soldered enamel resin, and a soldered polyester-imide resin, for example. A thin film of a self-bonding material is made of an alcohol bonding resin and a hot-air bonding resin, for example.

CCAW is a magnet wire made up as a compound lightweight material. Since a CCAW main body is formed with aluminum or aluminum alloy material in the center of CCAW in cross section, conductive wires is reduced in weight (all not depicted). For example, if CCAW with the same wire diameter as that of a copper wire is used, CCAW is about one third in weight relative to the copper wire. Since a layer of a copper material is formed around the aluminum or aluminum alloy material forming the center of CCAW in cross-section, CCAW is excellent in soldering properties and corrosion resistance. CCAW includes such CCAW that the conductive wire main body is made of aluminum, for example, such HCCAW (High-Tension Copper-Clad Aluminum Wire) that the conductive wire main body is made of an aluminum alloy, for example, and such UCCAW (Ultra High-Tension Copper-Clad Aluminum Wire) that the conductive wire main body is made of a special aluminum alloy, for example. The specific gravity of CCAW, HCCAW, and UCCAW is substantially 3 to 3.7, for example.

If the substantially linear conductors making up the coils 40, 70 are made of a material including light metal such as an aluminum material or an aluminum alloy material, the response characteristics are improved in the OPU 3 including the OBL 250, a pair of the driving coils 40, 40, 70, 70 made up of the substantially linear conductors, and the lens holder assembly 100 having the lens holders 10, 60, for example. A material including light metal such as an aluminum material or an aluminum alloy material has a specific gravity smaller than those of other metal materials, for example, and is considered as a material suitable for achieving weight reduction. For example, while the specific gravity of iron is substantially 7.85 to 7.87 and the specific gravity of copper is substantially 8.92 to 8.95, the specific gravity of aluminum is substantially 2.71. The specific gravity of aluminum is substantially one third of that of iron or copper, for example. If the substantially linear conductors making up the coils 40, 70 are made of a material including light metal such as an aluminum material or an aluminum alloy material, the coils 40, 70 is reduced in weight.

Since the substantially linear conductors making up the coils 40, 70 are made of a material including light metal, the lens holder assembly 100 provided with the OBL 250 and the coils 40, 70 is reduced in weight, and as a result, the lens holder assembly 100 may be moved easily. Therefore, the response characteristics of the OPU 3 are improved. In order to keep the price lower of the actuator 5 and the OPU 3, the coils 40, 40, 70, 70 depicted in FIG. 1 are made of the same conductive wires.

Depending on the design/specification, etc., of the OPU 3, coils in another form (not depicted) may be used instead of the coils 40, 40, 70, 70, for example. As coils (40, 40, 70, 70), a coil may be used which is made up such that a plating process is performed for circuit conductors on a board including a glass layer or a resin layer such as an epoxy resin layer, for example. A print coil is considered as such a coil, which may be used, for example. When the print coils (40, 40) are used, the coils (40, 40) are easily mounted on the lens holder (10). When the print coils (70, 70) are used, the coils (70, 70) are easily mounted on the lens holder (60). Since the coils (40, 40) are used which is made up such that a plating process is performed for circuit conductors on a board, the mounting operation of the coils (40, 40) on the lens holder (10) is more easily performed. When the coils (70, 70) are used which is made up such that a plating process is performed for circuit conductors on a board, the mounting operation of the coils (70, 70) on the lens holder (60) is more easily performed. Since the mounting operation of the coils (40, 40 or 70, 70) on the lens holder (10 or 60) is more easily performed, the assembly operation of the OPU (3) is easily performed. Since the assembly operation of the OPU (3) is easily performed, the price of the OPU (3) is reduced.

The OPU 3 includes the six substantially linear metal elastically supporting members 50 (FIG. 5), so-called substantially linear metal suspension wires 50, which is provided on the left and right mounting units 12, 12 of the substantially box-shaped holder assembly 100 and elastically support the holder assembly 100. For example, the substantially linear suspension wires 50 included in the OPU 3 are provided to extend substantially along the tangential direction D3, which is a direction orthogonal to the focus direction D1 defined as a direction substantially along the light axis direction of the OBL 250 and the tracking direction D2 defined as a direction substantially along the radial direction D2 of the optical disc M. When electricity that is considered as a drive signal, a control signal, etc., is passed through at least the four left and right suspension wires 50 out of the six left and right suspension wires 50 provided on the holder assembly 100 of the OPU 3, the electricity that is considered as the drive signal, the control signal, etc., is passed through the four coils 40, 40, 70, 70 that are provided on the holder assembly 100 of the OPU 3 and electrically connected to the suspension wires 50.

The substantially linear suspension wires 50 are formed by using phosphor bronze conductive wires, for example. For example, wires making up the suspension wires 50 are formed by using a piano wire material defined based on "JIS G 3502", piano wires defined based on "JIS G 3522", and hard steel wires defined based on "JIS G 3521". The suspension wires 50 are formed by using copper-plated conductive wires that is subjected to a plating process based on an electric plating method, for example. Specifically, the electrically conductive suspension wires 50 are formed such that steel wires or piano wires excellent in spring durability and fatigue strength are used to be plated with copper (Cu) excellent in electrical conductivity.

The OPU 3 includes the synthetic polymer damping material that restrains abnormal vibrations generated in the suspension wire 50, for example, and the synthetic resin damping holding member 140 that holds the damping material. The suspension wires 50 are inserted through holes (not depicted) of the synthetic resin damping holding member 140 provided on the back side of the metal frame yoke 130. The holes of the damping holding member 140 allowing the suspension wires 50 to be inserted therethrough are filled with a synthetic polymer damping material excellent in flexibility, so-called damping agent, for example. The damping holding member 140 is made of a synthetic resin material excellent in insulation. The damping holding member 140 is formed by using a synthetic resin material such as a polycarbonate resin, for example, based on the injection molding method excellent in mass productivity.

The OPU 3 includes the PWB 150 electrically connected and provided with the metal suspension wires 50 (FIG. 5). A board main body 151 of the PWB 150 is made of a synthetic resin material excellent in insulation. Circuit conductors on the synthetic resin board main body 151 are made of metal foils excellent in electrical conductivity. An insulating thin film is formed on the synthetic resin board main body 151 provided with the metal circuit conductors by plating the synthetic resin board main body 151 provided with the metal circuit conductors with a synthetic resin material excellent in insulation.

The OPU 3 includes a solder material that electrically connects the coils 40, 40, 70, 70 (FIG. 1), etc., to the suspension wires 50 (FIG. 5), etc., with reliability. The OPU 3 includes a solder material that electrically connects the suspension wires 50 (FIG. 5), etc., to the PWB 150, etc., with reliability. The environmentally friendly solder that does not contain lead, so-called lead-free solder is used as the solder material that is used when the suspension wires 50, the coils 40, 40, 70, 70, etc., are soldered. If the lead-free solder is used as the solder material, the natural environment is avoided from being affected by lead when the OPU 3, the optical disc apparatus 1 including the OPU 3, etc., are disassembled/discarded, for example. The lead-free solder includes Eco Solder (registered trademark) of Senju Metal Industry Co., Ltd., for example. Specifically, the lead-free solder includes Eco Solder M30 and M705 of Senju Metal Industry Co., Ltd., for example.

The OPU 3 includes the magnets 80, 90, 80, 90 (FIGS. 3 and 4) that generate the magnetism/magnetic force capable of driving the coils 40, 40, 70, 70 (FIG. 1). The magnets 80, 90, 80, 90 (FIGS. 3 and 4) corresponding to the coils 40, 40, 70, 70 (FIG. 1) include permanent magnets, for example. Specifically, the magnets 80, 90, 80, 90 (FIGS. 3 and 4) corresponding to the coils 40, 40, 70, 70 (FIG. 1) are made of magnets or magnet steel, for example. The magnet is a magnetic body primarily consisting of iron or iron oxide, for example. The magnet steel is an alloy iron, for example, formed by adding alloy elements such as chromium, aluminum, nickel, cobalt, etc., to iron, and is an alloy magnet that has a coercive force and permanent magnet characteristics with a high residual flux density due to quench hardening and precipitation hardening and that is capable of a forming process such as a rolling process.

For example, there is used the driving magnet 80/90 having a pair of two poles on which the one substantially rectangular positive pole surface portion 81/91 defined as the north-pole surface and the other substantially rectangular negative pole surface portion 82/92 defined as the south-pole surface are formed. In order to keep the price lower of the actuator 5 and the OPU 3, the magnets 80, 90 are formed as such magnetic bodies as to be made of the same material, be formed in the same shape, and have the same characteristics. Depending on the design/specification, etc., of the OPU 3 and the actuator 5, there may be used single-pole/double-pole magnets or multi-pole magnetized magnets having two or more poles magnetized, as the magnets 80, 90, for example.

For example, the magnets 80, 90 are made of a permanent magnet material. For example, the magnets 80, 90 are made of ferrite magnets that are inexpensive, have a great coercive force, are resistant to demagnetization, and are excellent in corrosion resistance. Even when the inexpensive ferrite magnets are used as the magnets 80 and 90, if the lens holder assembly 100 having the lens holders 10, 60, the actuator 5 including the lens holder 100, the OPU 3 including the actuator 5, and the optical disc apparatus 1 including the OPU 3 are configured, the sensitivity of the coils 40 to the magnets 80, 90 is maintained at a necessary level without deterioration of the sensitivity of the coils 40 to the magnets 80, 90 and a considerable increase in price is avoided. The ferrite magnets include the High-Energy Ferrite Magnet NMF (registered trademark) series of Hitachi Metals, Ltd., for example. Specific product names of NMF (registered trademark) categorized as the high-energy ferrite magnet include NMF3B and NMF12G, for example.

Depending on the design/specification, etc., of the OPU 3 and the actuator 5, the magnets 80, 90 may be rare-earth magnets that have a magnetic force higher than that of the ferrite magnets and have excellent heat stability, for example. The rare-earth magnets include Tosrex (registered trademark) of Toshiba Materials Co., Ltd., for example. Specific product names of Tosrex (registered trademark) categorized as the rare-earth cobalt magnet include TS-24 and TS-28HS, for example.

Depending on the design/specification, etc., of the OPU 3 and the actuator 5, the magnets 80, 90 may be alloy magnets, so-called metal magnets that generate a magnetic force higher than that of the ferrite magnets and that is capable of a plasticity working such as a rolling, for example. The alloy magnets, so-called metal magnets include Neomax (registered trademark) available from Hitachi Metals, Ltd., for example. Specific product names of Neomax (registered trademark) categorized as the metal magnet include MNX-31UH and NMX-33UH, for example.

The OPU 3 includes the frame yoke 130 provided with the magnets 80, 90 (FIGS. 3 and 4). The frame yoke 130 provided with the magnets 80, 90 is made of a metal material attracted by a magnetic body. For example, the frame yoke 130 is formed by performing the press metal molding processes such as a punching process, a bending process, and a pressing process for a thin steel plate such as a rolled steel plate. Specifically a metal material plate primarily consisting of iron such as rolled steel plate is punched/bent by a press forming machine, to form the frame yoke 130, for example. The metal material plate primarily consisting of iron includes a stainless steel plate, a rolled steel plate, and a steel strip, for example. For example, a cold rolled plate and a steel strip include SPCC, SPCD, SPCE, etc., defined based on "JIS G 3141".

The OPU 3 (FIG. 5) includes a cover plate 180 that protects the various parts of the OPU 3. When the OPU 3 is assembled, the cover plate 180 protecting the various parts is provided on the upper side of the OPU 3, for example. The cover plate 180 is press-formed by using a thin metal plate excellent in heat radiation characteristics, for example. Instead of the cover plate 180 made of a thin metal plate, the black cover plate 180 made of a synthetic resin may be provided on the upper side of the OPU 3, for example.

The OPU 3 includes an adhesive that bonds various parts/various members. The adhesive includes an electron beam curing adhesive such as an ultraviolet curing adhesive primary consisting of a one component or two component epoxy resin, a one component acrylic resin, etc., for example. The adhesive also includes a thermosetting resin primary consisting of a one component or two component epoxy resin, a modified acrylic resin, etc., for example. The adhesives including a one component resin, etc., have excellent bonding workability, for example, and the adhesives including a two component resin, etc., have excellent price characteristics, for example.

The OPU 3 (FIG. 5) includes the housing 300 (FIGS. 5 and 6) that is capable of being provided with the above various optical system parts, the above various electric system parts, etc., and coming in sliding contact with the slide shafts 410, 420 (FIG. 6). For example, since the housing 300 is reduced in weight by using a light metal material or a synthetic resin material to form the housing 300, the OPU 3 including the housing 300 may be moved smoothly on the slide shafts 410, 420 on a responsive manner.

The housing 300 making up the OPU 3 is made of metal including at least one or more elements selected from a group consisting of aluminum (Al), magnesium (Mg), and zinc (Zn), for example. Specifically, the housing 300 making up the OPU 3 is made of non-ferrous metal such as aluminum (Al), magnesium (Mg), and zinc (Zn) or a die-casting alloy including aluminum (Al), magnesium (Mg), and zinc (Zn), for example. Aluminum, magnesium, and zinc are non-ferrous metals having excellent corrosion resistance and a smaller specific gravity than that of iron. For example, the housing 300 is made of a non-ferrous metal material such as an aluminum alloy primary consisting of aluminum, for example.

Alternatively, the housing 300 making up the OPU 3 is made of a heat-resistant synthetic resin composition that includes, as a base material, a polyarylene sulfide (PAS) resin such as a polyphenylene sulfide (PPS) which is excellent in mechanical characteristics, sliding characteristics, dimension stability, heat resistance, injection moldability, and electric characteristics such as insulation characteristics, and which is capable of more weight reduction than iron materials, for example. A resin material has a smaller specific gravity than that of iron, for example, and is considered as a material suitable for weight reduction.

A formation material of the slide shafts 410, 420 for supporting the OPU 3 includes stainless steel, for example. Specifically, the formation material of the slide shafts 410, 420 includes a "hot finish stainless steel rod" defined based on "JIS G 4304", for example. The formation material of the slide shafts 410, 420 includes a "cold forming stainless steel rod" defined based on "JIS G 4318", for example.

As depicted in FIG. 6, the optical disc apparatus 1 includes: a tray (not depicted) that is capable of being provided with the optical disc M and being taken in and out of an optical disc apparatus main body 1a; a clamp device that have a turntable 460 and a clamper (not depicted) facing the turntable 460 and that is capable of clamping the optical disc M to be fixed; a drive device 450 that includes the turntable 460 and drives to rotate the optical disc M; the OPU 3 that applies a laser beam to the optical disc M; and a pair of the slide shafts 410, 420 that support the OPU 3 in a movable manner when the OPU 3 is moved along the radial direction D2 of the optical disc M.

The optical disc M is housed into the optical disc apparatus 1 by using a substantially plate-shaped synthetic resin tray that is freely moved in and out of a substantially rectangular box-shaped metal housing 400 making up the optical disc apparatus 1 (FIG. 6). The drive apparatus 450 for rotating the optical disc M is housed in the housing 400 making up the optical disc apparatus 1. The disc drive apparatus 450 including the substantially circular-plate-shaped synthetic resin turntable 460 allowing the optical disc M to be mounted thereon is used as the drive apparatus 450. The OPU 3 for reading data/information in the optical disc M and writing data/information into the optical disc M is provided in the housing 400 making up the optical disc apparatus 1. A metal cover (not depicted) is mounted on the housing 400 provided with various parts to assemble the optical disc apparatus 1.

By using the clamp device including the turntable 460 and the clamper facing the turntable 460, the optical disc M having a circular hole Mb formed at a center portion Mc is securely clamped and detachably fixed in a positioned state between the turntable 460 and the clamper. The turntable 460 provided on a spindle motor (not depicted) of the drive apparatus 450 has both functions of aligning the optical disc M and ensuring the stability of the high-speed rotation of the optical disc M.

The optical disc apparatus 1 (FIG. 6) includes the OPU 3 (FIGS. 5 and 6) having the actuator 5 (FIGS. 1 to 4).

Since the actuator 5 depicted in FIGS. 1 to 4 is configured and the OPU 3 (FIG. 5) including the actuator 5 is built into the optical disc apparatus 1 (FIG. 6), the optical disc apparatus 1 (FIG. 6) may be configured including such an OPU 3 (FIG. 5) that the sensitivity of the coils 40 (FIGS. 1, 3, and 4) to the magnets 80, 90 (FIGS. 3 and 4) is improved.

The lens holder assembly 100 including the lens holders 10, 60, the actuator 5 including the lens holder assembly 100, the OPU 3 including the actuator 5, and the optical disc apparatus 1 including the OPU 3 may be employed in a recording/reproducing apparatus that records data/information, etc., into the optical disc M and that reproduces data/information, etc., in the optical disc M. The lens holder assembly 100 including the lens holders 10, 60, the actuator 5 including the lens holder assembly 100, the OPU 3 including the actuator 5, and the optical disc apparatus 1 including the OPU 3 may be employed in a reproducing-only apparatus that reproduces data/information, etc., in the various optical discs M.

The lens holder assembly 100 including the lens holders 10, 60, the actuator 5 including the lens holder assembly 100, and the OPU 3 including the actuator 5 are provided in the optical disc apparatus 1 that is built into computers, audio/visual devices, game machines, and vehicle-mounted devices (all not depicted), for example. The lens holder assembly 100 including the lens holders 10, 60, the actuator 5 including the lens holder assembly 100, the OPU 3 including the actuator 5, and the optical disc apparatus 1 including the OPU 3 may being provided in computers such as notebook PC, laptop PC, desktop PC, and vehicle-mounted computers; game machines such as computer game machines; and audio and/or visual apparatuses such as CD players/CD recorders and DVD players/DVD recorders (all not depicted), for example.

The lens holder assembly 100 including the lens holders 10, 60, the actuator 5 including the lens holder assembly 100, the OPU 3 including the actuator 5, and the optical disc apparatus 1 including the OPU 3 may support a plurality of optical discs such as "CD"-series discs, "DVD"-series discs, "HD DVD"-series discs, "Blu-ray Disc"-series discs, etc. The lens holder assembly 100 including the lens holders 10, 60, the actuator 5 including the lens holder assembly 100, the OPU 3 including the actuator 5, and the optical disc apparatus 1 including the OPU 3 may support a single optical disc having a plurality of signal surface portions. The lens holder assembly 100 including the lens holders 10, 60, the actuator 5 including the lens holder assembly 100, the OPU 3 including the actuator 5, and the optical disc apparatus 1 including the OPU 3 may be provided in computers, audio and/or visual apparatuses, game machines, and vehicle-mounted apparatuses that support the various optical discs M such as "CD", "DVD", "HD DVD", and "Blu-ray Disc" (all not depicted), for example.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical pickup apparatus comprising:
an objective lens;
a holding member to which the objective lens is mounted;
a magnetic member facing the holding member; and
a substantially flat-plate-shaped coil in a substantially rectangular annular shape attached along a surface of the holding member facing the magnetic member;
the holding member including a protruding portion protruding from the surface facing the magnetic member toward the magnetic member such that a part of the coil facing the magnetic member is pushed toward the magnetic member, the pushed part of the coil is disposed in closer proximity to the magnetic member than other portions of the coil facing the magnetic member.

2. The optical pickup apparatus of claim 1, wherein
the surface of the holding member facing the magnetic member is formed in a focus direction and a tracking direction, and
a portion of the coil is formed along the focus direction.

3. The optical pickup apparatus of claim 1, wherein
the protruding portion has a substantially rectangular pedestal-shape.

4. The optical pickup apparatus of claim 3, wherein
the holding member has, on the surface facing the magnetic member, a coil mounting portion around which the coil is wound, and
the coil mounting portion has, at a position facing a part of the coil formed along the tracking direction, a substantially plate-shaped flange portion configured to prevent the coil from being unwound from the coil mounting portion.

5. The optical pickup apparatus of claim 4, wherein
the protruding portion protrudes such that a surface, on a side facing the magnetic member, of a part of the coil pushed out by the protruding member and a surface, on a side facing the magnetic member, of the flange portion are substantially positioned on a same plane.

6. The optical pickup apparatus of claim 4, wherein
the protruding portion includes a winding facilitating portion which is an inclined surface configured to facilitate winding of the coil along with an approach from a side farther from a coil winding shaft to close the coil winding shaft.

7. The optical pickup apparatus of claim 4, wherein
the protruding portion includes a curvature relaxing portion which is an inclined surface that relaxes a degree of curvature of the coil curved and deformed by the protruding portion along with an approach toward a center of the protruding portion along the focusing direction.

* * * * *